United States Patent
Morris et al.

(10) Patent No.: US 9,457,845 B2
(45) Date of Patent: Oct. 4, 2016

(54) LOBULAR ELASTIC TUBE ALIGNMENT AND RETENTION SYSTEM FOR PROVIDING PRECISE ALIGNMENT OF COMPONENTS

(71) Applicant: GM GLOBAL TECHNOLOGY OPERATIONS LLC, Detroit, MI (US)

(72) Inventors: Steven E. Morris, Fair Haven, MI (US); Jennifer P. Lawall, Waterford, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 445 days.

(21) Appl. No.: 14/044,199

(22) Filed: Oct. 2, 2013

(65) Prior Publication Data
US 2015/0093178 A1    Apr. 2, 2015

(51) Int. Cl.
*B62D 27/02*    (2006.01)
*B62D 27/06*    (2006.01)
(Continued)

(52) U.S. Cl.
CPC .............. *B62D 27/02* (2013.01); *B60R 13/00* (2013.01); *B62D 27/06* (2013.01); *F16B 19/004* (2013.01); *F16B 21/086* (2013.01); (Continued)

(58) Field of Classification Search
CPC ...... B62D 27/02; B62D 27/06; B62D 13/00; B62D 13/0206; B62D 19/52; B62D 16/0215; F16B 19/004; F16B 19/04; F16B 21/086; F16B 5/065; Y10T 403/1616
USPC ........... 296/208; 248/74.1, 65, 74.2; 24/457, 24/297; 411/508, 509, 510; 403/13
See application file for complete search history.

(56) References Cited

U.S. PATENT DOCUMENTS 1,219,398 A    3/1917  Huntsman
1,261,036 A    4/1918  Kerns
(Continued)

FOREIGN PATENT DOCUMENTS

BE    842302 A    9/1976
CN    1032581 A    4/1989
(Continued)

OTHER PUBLICATIONS

"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.
(Continued)

*Primary Examiner* — James Ference
(74) *Attorney, Agent, or Firm* — Cantor Colburn LLP

(57) ABSTRACT

An elastically averaged alignment system has a first component having a first alignment member and an elastically deformable alignment element, and a second component having a second alignment member and an alignment aperture. The elastically deformable alignment element is configured and disposed to interferingly, deformably and matingly engage the alignment aperture. The elastically deformable alignment element includes a lobular hollow tube having four lobes, with a slotted retention feature on each of two opposing lobes that extend from an outer surface of the hollow tube radially inward toward a central axis of the hollow tube. Portions of the elastically deformable alignment element when inserted into the alignment aperture elastically deform to an elastically averaged final configuration that aligns the first alignment member with the second alignment member in at least two planar orthogonal directions. Each of the slotted retention features engages with an edge of the alignment aperture.

16 Claims, 7 Drawing Sheets

(51) Int. Cl.
  *B60R 13/00* (2006.01)
  *F16B 19/00* (2006.01)
  *F16B 21/08* (2006.01)
  *B60R 13/02* (2006.01)
  *B60R 19/52* (2006.01)
  *F16B 5/06* (2006.01)

(52) U.S. Cl.
  CPC ........... *B60R 13/0206* (2013.01); *B60R 19/52* (2013.01); *F16B 5/065* (2013.01); *Y10T 403/1616* (2015.01)

(56) References Cited

U.S. PATENT DOCUMENTS

| | | |
|---|---|---|
| 1,301,302 A | 4/1919 | Nolan |
| 1,556,233 A | 10/1925 | Maise |
| 1,819,126 A | 8/1931 | Scheibe |
| 1,929,848 A | 10/1933 | Neely |
| 1,968,168 A | 7/1934 | Place |
| 1,982,076 A | 11/1934 | Spahn |
| 1,999,990 A | 4/1935 | Carr |
| 2,006,525 A | 7/1935 | Thal |
| 2,267,558 A | 12/1941 | Birger et al. |
| 2,275,103 A | 3/1942 | Gooch et al. |
| 2,275,900 A | 3/1942 | Hall |
| 2,385,180 A | 9/1945 | Allen |
| 2,482,488 A | 9/1949 | Franc |
| 2,560,530 A | 7/1951 | Burdick |
| 2,612,139 A | 9/1952 | Collins |
| 2,688,894 A | 9/1954 | Modrey |
| 2,693,014 A | 11/1954 | Monahan |
| 2,707,607 A | 5/1955 | O'Connor |
| 2,778,399 A | 1/1957 | Mroz |
| 2,780,128 A | 2/1957 | Rapata |
| 2,788,046 A | 4/1957 | Joseph |
| 2,862,040 A | 11/1958 | Curran |
| 2,902,902 A | 9/1959 | Slone |
| 2,946,612 A | 7/1960 | Ahlgren |
| 2,958,230 A | 11/1960 | Haroldson |
| 3,005,282 A | 10/1961 | Christiansen |
| 3,014,563 A | 12/1961 | Bratton |
| 3,089,269 A | 5/1963 | McKiernan |
| 3,130,512 A | 4/1964 | Van Buren, Jr. |
| 3,152,376 A | 10/1964 | Boser |
| 3,168,961 A | 2/1965 | Yates |
| 3,169,004 A | 2/1965 | Rapata |
| 3,169,439 A | 2/1965 | Rapata |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,358 A | 2/1966 | Dehm |
| 3,233,503 A | 2/1966 | Birger |
| 3,244,057 A | 4/1966 | Mathison |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,551,963 A | 1/1971 | Long |
| 3,643,968 A | 2/1972 | Horvath |
| 3,669,484 A | 6/1972 | Bernitz |
| 3,680,272 A | 8/1972 | Meyer |
| 3,733,655 A | 5/1973 | Kolibar |
| 3,800,369 A | 4/1974 | Nikolits |
| 3,841,044 A | 10/1974 | Brown |
| 3,841,682 A | 10/1974 | Church |
| 3,842,565 A | 10/1974 | Brown et al. |
| 3,845,961 A | 11/1974 | Byrd, III |
| 3,847,492 A | 11/1974 | Kennicutt et al. |
| 3,860,209 A | 1/1975 | Strecker |
| 3,868,804 A | 3/1975 | Tantlinger |
| 3,895,408 A | 7/1975 | Leingang |
| 3,897,967 A | 8/1975 | Barenyl |
| 3,905,570 A | 9/1975 | Nieuwveld |
| 3,972,550 A | 8/1976 | Boughton |
| 3,988,808 A | 11/1976 | Poe et al. |
| 4,035,874 A | 7/1977 | Liljendahl |
| 4,039,215 A | 8/1977 | Minhinnick |
| 4,042,307 A | 8/1977 | Jarvis |
| 4,043,585 A | 8/1977 | Yamanaka |
| 4,158,511 A | 6/1979 | Herbenar |
| 4,169,297 A | 10/1979 | Weihrauch |
| 4,193,588 A | 3/1980 | Doneaux |
| 4,213,675 A | 7/1980 | Pilhall |
| 4,237,573 A | 12/1980 | Weihrauch |
| 4,267,680 A | 5/1981 | Delattre |
| 4,300,851 A | 11/1981 | Thelander |
| 4,313,609 A | 2/1982 | Clements |
| 4,314,417 A | 2/1982 | Cain |
| 4,318,208 A | 3/1982 | Borja |
| 4,325,574 A | 4/1982 | Umemoto et al. |
| 4,363,839 A | 12/1982 | Watanabe et al. |
| 4,364,150 A | 12/1982 | Remington |
| 4,384,803 A | 5/1983 | Cachia |
| 4,394,853 A | 7/1983 | Lopez-Crevillen et al. |
| 4,406,033 A | 9/1983 | Chisholm et al. |
| 4,477,142 A | 10/1984 | Cooper |
| 4,481,160 A | 11/1984 | Bree |
| 4,527,760 A | 7/1985 | Salacuse |
| 4,575,060 A | 3/1986 | Kitagawa |
| 4,591,203 A | 5/1986 | Furman |
| 4,599,768 A | 7/1986 | Doyle |
| 4,605,575 A | 8/1986 | Auld et al. |
| 4,616,951 A | 10/1986 | Maatela |
| 4,648,649 A | 3/1987 | Beal |
| 4,654,760 A | 3/1987 | Matheson et al. |
| 4,672,732 A | 6/1987 | Ramspacher |
| 4,745,656 A | 5/1988 | Revlett |
| 4,757,655 A | 7/1988 | Jentoft et al. |
| 4,767,647 A | 8/1988 | Bree |
| 4,805,272 A | 2/1989 | Yamaguchi |
| 4,807,335 A | 2/1989 | Candea |
| 4,817,999 A | 4/1989 | Drew |
| 4,819,983 A | 4/1989 | Alexander et al. |
| 4,843,975 A | 7/1989 | Welsch |
| 4,843,976 A | 7/1989 | Pigott et al. |
| 4,865,502 A | 9/1989 | Maresch |
| 4,881,764 A | 11/1989 | Takahashi et al. |
| 4,917,426 A | 4/1990 | Copp |
| 4,973,212 A | 11/1990 | Jacobs |
| 4,977,648 A | 12/1990 | Eckerud |
| 5,005,265 A | 4/1991 | Muller |
| 5,039,267 A | 8/1991 | Wollar |
| 5,100,015 A | 3/1992 | Vanderstuyf |
| 5,111,557 A | 5/1992 | Baum |
| 5,139,285 A | 8/1992 | Lasinski |
| 5,154,479 A | 10/1992 | Sautter, Jr. |
| 5,165,749 A | 11/1992 | Sheppard |
| 5,170,985 A | 12/1992 | Killworth et al. |
| 5,180,219 A | 1/1993 | Geddie |
| 5,208,507 A | 5/1993 | Jung |
| 5,212,853 A | 5/1993 | Kaneko |
| 5,234,122 A | 8/1993 | Cherng |
| 5,250,001 A | 10/1993 | Hansen |
| 5,297,322 A | 3/1994 | Kraus |
| 5,309,663 A | 5/1994 | Shirley |
| 5,333,965 A | 8/1994 | Mailey |
| 5,339,491 A | 8/1994 | Sims |
| 5,342,139 A | 8/1994 | Hoffman |
| 5,348,356 A | 9/1994 | Moulton |
| 5,368,427 A | 11/1994 | Pfaffinger |
| 5,368,797 A | 11/1994 | Quentin et al. |
| 5,397,206 A | 3/1995 | Sihon |
| 5,407,310 A | 4/1995 | Kassouni |
| 5,446,965 A | 9/1995 | Makridis |
| 5,507,610 A | 4/1996 | Benedetti et al. |
| 5,513,603 A | 5/1996 | Ang et al. |
| 5,524,786 A | 6/1996 | Skudlarek |
| 5,538,079 A | 7/1996 | Pawlick |
| 5,556,808 A | 9/1996 | Williams et al. |
| 5,566,840 A | 10/1996 | Waldner |
| 5,575,601 A | 11/1996 | Skufca |

(56) References Cited

U.S. PATENT DOCUMENTS

| | | |
|---|---|---|
| 5,577,301 A | 11/1996 | DeMaagd |
| 5,577,779 A | 11/1996 | Dangel |
| 5,580,204 A | 12/1996 | Hultman |
| 5,586,372 A | 12/1996 | Eguchi et al. |
| 5,593,265 A | 1/1997 | Kizer |
| 5,601,453 A | 2/1997 | Horchler |
| 5,629,823 A | 5/1997 | Mizuta |
| 5,634,757 A | 6/1997 | Schanz |
| 5,639,140 A | 6/1997 | Labrash |
| 5,657,516 A | 8/1997 | Berg et al. |
| 5,666,749 A | 9/1997 | Waters |
| 5,667,271 A | 9/1997 | Booth |
| 5,670,013 A | 9/1997 | Huang et al. |
| 5,698,276 A | 12/1997 | Mirabitur |
| 5,702,779 A | 12/1997 | Siebelink, Jr. et al. |
| 5,706,559 A | 1/1998 | Oliver |
| 5,736,221 A | 4/1998 | Hardigg et al. |
| 5,765,942 A | 6/1998 | Shirai et al. |
| 5,775,860 A | 7/1998 | Meyer |
| 5,795,118 A | 8/1998 | Osada et al. |
| 5,797,170 A | 8/1998 | Akeno |
| 5,797,714 A | 8/1998 | Oddenino |
| 5,803,646 A | 9/1998 | Weihrauch |
| 5,806,915 A | 9/1998 | Takabatake |
| 5,810,535 A | 9/1998 | Fleckenstein et al. |
| 5,820,292 A | 10/1998 | Fremstad |
| 5,846,631 A | 12/1998 | Nowosiadly |
| 5,915,678 A | 6/1999 | Slocum et al. |
| 5,920,200 A | 7/1999 | Pendse |
| 5,929,382 A | 7/1999 | Moore |
| 5,931,514 A | 8/1999 | Chung |
| 5,934,729 A | 8/1999 | Baack |
| 5,941,673 A | 8/1999 | Hayakawa et al. |
| 5,988,678 A | 11/1999 | Nakamura |
| 6,006,941 A | 12/1999 | Hitchings |
| 6,010,306 A | 1/2000 | Bucher |
| 6,062,763 A | 5/2000 | Sirois et al. |
| 6,073,315 A | 6/2000 | Rasmussen |
| 6,079,083 A | 6/2000 | Akashi |
| 6,095,594 A | 8/2000 | Riddle et al. |
| 6,103,987 A | 8/2000 | Nordquist |
| 6,109,882 A | 8/2000 | Popov |
| 6,152,436 A | 11/2000 | Sonderegger et al. |
| 6,164,603 A | 12/2000 | Kawai |
| 6,193,430 B1 | 2/2001 | Culpepper et al. |
| 6,199,248 B1 | 3/2001 | Akashi |
| 6,202,962 B1 | 3/2001 | Snyder |
| 6,209,175 B1 | 4/2001 | Gershenson |
| 6,209,178 B1 | 4/2001 | Wiese et al. |
| 6,254,304 B1 | 7/2001 | Takizawa et al. |
| 6,264,869 B1 | 7/2001 | Notarpietro et al. |
| 6,283,540 B1 | 9/2001 | Siebelink, Jr. et al. |
| 6,286,214 B1 | 9/2001 | Bean |
| 6,289,560 B1 | 9/2001 | Guyot |
| 6,299,478 B1 | 10/2001 | Jones et al. |
| 6,311,960 B1 | 11/2001 | Pierman et al. |
| 6,318,585 B1 | 11/2001 | Asagiri |
| 6,321,495 B1 | 11/2001 | Oami |
| 6,336,767 B1 | 1/2002 | Nordquist et al. |
| 6,345,420 B1 | 2/2002 | Nabeshima |
| 6,349,904 B1 | 2/2002 | Polad |
| 6,351,380 B1 | 2/2002 | Curlee |
| 6,354,574 B1 | 3/2002 | Oliver et al. |
| 6,354,815 B1 | 3/2002 | Svihla et al. |
| 6,378,931 B1 | 4/2002 | Kolluri et al. |
| 6,398,449 B1 | 6/2002 | Loh |
| 6,470,540 B2 | 10/2002 | Aamodt et al. |
| 6,478,102 B1 | 11/2002 | Puterbaugh |
| 6,484,370 B2 | 11/2002 | Kanie et al. |
| 6,485,241 B1 | 11/2002 | Oxford |
| 6,498,297 B2 | 12/2002 | Samhammer |
| 6,523,229 B2 | 2/2003 | Severson |
| 6,523,817 B1 | 2/2003 | Landry, Jr. |
| 6,533,391 B2 | 3/2003 | Pan |
| 6,543,979 B2 | 4/2003 | Iwatsuki |
| 6,557,260 B1 | 5/2003 | Morris |
| 6,568,701 B1 | 5/2003 | Burdack et al. |
| 6,579,397 B1 | 6/2003 | Spain et al. |
| 6,591,801 B1 | 7/2003 | Fonville |
| 6,609,717 B2 | 8/2003 | Hinson |
| 6,637,095 B2 | 10/2003 | Stumpf et al. |
| 6,658,698 B2 | 12/2003 | Chen |
| 6,662,411 B2 | 12/2003 | Rubenstein |
| 6,664,470 B2 | 12/2003 | Nagamoto |
| 6,668,424 B1 | 12/2003 | Allen |
| 6,677,065 B2 | 1/2004 | Blauer |
| 6,692,016 B2 | 2/2004 | Yokota |
| 6,712,329 B2 | 3/2004 | Ishigami et al. |
| 6,746,172 B2 | 6/2004 | Culpepper |
| 6,757,942 B2 | 7/2004 | Matsui |
| 6,821,091 B2 | 11/2004 | Lee |
| 6,840,969 B2 | 1/2005 | Kobayashi et al. |
| 6,857,676 B2 | 2/2005 | Kawaguchi et al. |
| 6,857,809 B2 | 2/2005 | Granata |
| 6,872,053 B2 | 3/2005 | Bucher |
| 6,908,117 B1 | 6/2005 | Pickett, Jr. et al. |
| 6,932,416 B2 | 8/2005 | Clauson |
| 6,948,753 B2 | 9/2005 | Yoshida et al. |
| 6,951,349 B2 | 10/2005 | Yokota |
| 6,957,939 B2 | 10/2005 | Wilson |
| 6,959,954 B2 | 11/2005 | Brandt et al. |
| 6,966,601 B2 | 11/2005 | Matsumoto et al. |
| 6,971,831 B2 | 12/2005 | Fattori et al. |
| 6,997,487 B2 | 2/2006 | Kitzis |
| 7,000,941 B2 | 2/2006 | Yokota |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,055,785 B1 | 6/2006 | Diggle, III |
| 7,055,849 B2 | 6/2006 | Yokota |
| 7,059,628 B2 | 6/2006 | Yokota |
| 7,073,260 B2 | 7/2006 | Jensen |
| 7,089,998 B2 | 8/2006 | Crook |
| 7,097,198 B2 | 8/2006 | Yokota |
| 7,121,611 B2 | 10/2006 | Hirotani et al. |
| 7,144,183 B2 | 12/2006 | Lian et al. |
| 7,165,310 B2 | 1/2007 | Murakami et al. |
| 7,172,210 B2 | 2/2007 | Yokota |
| 7,178,855 B2 | 2/2007 | Catron et al. |
| 7,198,315 B2 | 4/2007 | Cass et al. |
| 7,207,758 B2 | 4/2007 | Leon et al. |
| 7,234,852 B2 | 6/2007 | Nishizawa et al. |
| 7,275,296 B2 | 10/2007 | Dicesare |
| 7,306,418 B2 | 12/2007 | Kornblum |
| 7,322,500 B2 | 1/2008 | Maierholzner |
| 7,344,056 B2 | 3/2008 | Shelmon et al. |
| 7,360,964 B2 | 4/2008 | Tsuya |
| 7,369,408 B2 | 5/2008 | Chang |
| 7,435,031 B2 | 10/2008 | Granata |
| 7,454,105 B2 | 11/2008 | Yi |
| 7,487,884 B2 | 2/2009 | Kim |
| 7,493,716 B2 | 2/2009 | Brown |
| 7,500,440 B2 | 3/2009 | Chiu |
| 7,547,061 B2 | 6/2009 | Horimatsu |
| 7,557,051 B2 | 7/2009 | Ryu et al. |
| 7,568,316 B2 | 8/2009 | Choby et al. |
| 7,591,573 B2 | 9/2009 | Maliar et al. |
| D602,349 S | 10/2009 | Andersson |
| 7,614,836 B2 | 11/2009 | Mohiuddin |
| 7,672,126 B2 | 3/2010 | Yeh |
| 7,677,650 B2 | 3/2010 | Huttenlocher |
| 7,727,667 B2 | 6/2010 | Sakurai |
| 7,764,853 B2 | 7/2010 | Yi et al. |
| 7,793,998 B2 | 9/2010 | Matsui et al. |
| 7,802,831 B2 | 9/2010 | Isayama et al. |
| 7,803,015 B2 | 9/2010 | Pham |
| 7,828,372 B2 | 11/2010 | Ellison |
| 7,832,693 B2 | 11/2010 | Moerke et al. |
| 7,862,272 B2 | 1/2011 | Nakajima |
| 7,869,003 B2 | 1/2011 | Van Doren et al. |
| 7,883,137 B2 | 2/2011 | Bar |
| 7,891,926 B2 | 2/2011 | Jackson, Jr. |
| 7,922,415 B2 | 4/2011 | Rudduck et al. |

(56) References Cited

U.S. PATENT DOCUMENTS

| | | |
|---|---|---|
| 7,946,684 B2 | 5/2011 | Drury et al. |
| 7,959,214 B2 | 6/2011 | Salhoff |
| 8,029,222 B2 | 10/2011 | Nitsche |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,203,496 B2 | 6/2012 | Miller et al. |
| 8,203,843 B2 | 6/2012 | Chen |
| 8,206,029 B2 | 6/2012 | Vaucher et al. |
| 8,228,640 B2 | 7/2012 | Woodhead et al. |
| 8,249,679 B2 | 8/2012 | Cui |
| 8,261,581 B2 | 9/2012 | Cerruti et al. |
| 8,263,889 B2 | 9/2012 | Takahashi et al. |
| 8,276,961 B2 | 10/2012 | Kwolek |
| 8,291,553 B2 | 10/2012 | Moberg |
| 8,297,137 B2 | 10/2012 | Dole |
| 8,297,661 B2 | 10/2012 | Proulx et al. |
| 8,312,887 B2 | 11/2012 | Dunn et al. |
| 8,371,788 B2 | 2/2013 | Lange |
| 8,414,048 B1 | 4/2013 | Kwolek |
| 8,424,173 B2 | 4/2013 | Shiba |
| 8,444,199 B2 | 5/2013 | Takeuchi et al. |
| 8,474,214 B2 | 7/2013 | Dawe |
| 8,480,186 B2 | 7/2013 | Wang |
| 8,511,707 B2 | 8/2013 | Amamori |
| 8,572,818 B2 | 11/2013 | Hofmann |
| 8,579,141 B2 | 11/2013 | Tejima |
| 8,619,504 B2 | 12/2013 | Wyssbrod |
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,746,801 B2 | 6/2014 | Nakata |
| 8,773,846 B2 | 7/2014 | Wang |
| 8,811,004 B2 | 8/2014 | Liu |
| 8,826,499 B2 | 9/2014 | Tempesta |
| 8,833,771 B2 | 9/2014 | Lesnau |
| 8,833,832 B2 | 9/2014 | Whipps |
| 8,834,058 B2 | 9/2014 | Woicke |
| 8,905,812 B2 | 12/2014 | Pai-Chen |
| 8,910,350 B2 | 12/2014 | Poulakis |
| 9,003,891 B2 | 4/2015 | Frank |
| 9,039,318 B2 | 5/2015 | Mantei et al. |
| 9,050,690 B2 | 6/2015 | Hammer et al. |
| 9,061,403 B2 | 6/2015 | Colombo et al. |
| 9,061,715 B2 | 6/2015 | Morris |
| 9,062,991 B2 | 6/2015 | Kanagaraj |
| 9,067,625 B2 | 6/2015 | Morris |
| 9,194,413 B2 | 11/2015 | Christoph |
| 2001/0016986 A1 | 8/2001 | Bean |
| 2001/0030414 A1 | 10/2001 | Yokota |
| 2001/0045757 A1 | 11/2001 | Kanie et al. |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0130239 A1 | 9/2002 | Ishigami et al. |
| 2002/0136617 A1 | 9/2002 | Imahigashi |
| 2003/0007831 A1 | 1/2003 | Lian et al. |
| 2003/0059255 A1 | 3/2003 | Kirchen |
| 2003/0080131 A1 | 5/2003 | Fukuo |
| 2003/0082986 A1 | 5/2003 | Wiens et al. |
| 2003/0085618 A1 | 5/2003 | Rhodes |
| 2003/0087047 A1 | 5/2003 | Blauer |
| 2003/0108401 A1 | 6/2003 | Agha et al. |
| 2003/0180122 A1 | 9/2003 | Dobson |
| 2004/0028503 A1 | 2/2004 | Charles |
| 2004/0037637 A1 | 2/2004 | Lian et al. |
| 2004/0052574 A1 | 3/2004 | Grubb |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2004/0262873 A1 | 12/2004 | Wolf et al. |
| 2005/0016116 A1 | 1/2005 | Scherff |
| 2005/0031946 A1 | 2/2005 | Kruger et al. |
| 2005/0042057 A1 | 2/2005 | Konig et al. |
| 2005/0054229 A1 | 3/2005 | Tsuya |
| 2005/0082449 A1 | 4/2005 | Kawaguchi et al. |
| 2005/0109489 A1 | 5/2005 | Kobayashi |
| 2005/0156409 A1 | 7/2005 | Yokota |
| 2005/0156410 A1 | 7/2005 | Yokota |
| 2005/0156416 A1 | 7/2005 | Yokota |
| 2005/0217088 A1 | 10/2005 | Lin |
| 2005/0244250 A1 | 11/2005 | Okada et al. |
| 2006/0082187 A1 | 4/2006 | Hernandez et al. |
| 2006/0092653 A1 | 5/2006 | Tachiiwa et al. |
| 2006/0102214 A1 | 5/2006 | Clemons |
| 2006/0110109 A1 | 5/2006 | Yi et al. |
| 2006/0113755 A1 | 6/2006 | Yokota |
| 2006/0125286 A1 | 6/2006 | Horimatsu et al. |
| 2006/0141318 A1 | 6/2006 | MacKinnon et al. |
| 2006/0163902 A1 | 7/2006 | Engel |
| 2006/0170242 A1 | 8/2006 | Forrester et al. |
| 2006/0197356 A1 | 9/2006 | Catron et al. |
| 2006/0202449 A1 | 9/2006 | Yokota |
| 2006/0237995 A1 | 10/2006 | Huttenlocher |
| 2006/0249520 A1 | 11/2006 | DeMonte |
| 2006/0264076 A1 | 11/2006 | Chen |
| 2007/0034636 A1 | 2/2007 | Fukuo |
| 2007/0040411 A1 | 2/2007 | Dauvergne |
| 2007/0051572 A1 | 3/2007 | Beri |
| 2007/0113483 A1 | 5/2007 | Hernandez |
| 2007/0113485 A1 | 5/2007 | Hernandez |
| 2007/0126211 A1 | 6/2007 | Moerke et al. |
| 2007/0137018 A1 | 6/2007 | Aigner et al. |
| 2007/0144659 A1 | 6/2007 | De La Fuente |
| 2007/0205627 A1 | 9/2007 | Ishiguro |
| 2007/0227942 A1 | 10/2007 | Hirano |
| 2007/0251055 A1 | 11/2007 | Gerner |
| 2007/0258756 A1 | 11/2007 | Olshausen |
| 2007/0274777 A1 | 11/2007 | Winkler |
| 2007/0292205 A1 | 12/2007 | Duval |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0196535 A1 | 8/2008 | Dole |
| 2008/0217796 A1 | 9/2008 | Van Bruggen et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0093111 A1 | 4/2009 | Buchwalter et al. |
| 2009/0126168 A1 | 5/2009 | Kobe et al. |
| 2009/0134652 A1 | 5/2009 | Araki |
| 2009/0141449 A1 | 6/2009 | Yeh |
| 2009/0154303 A1 | 6/2009 | Vaucher et al. |
| 2009/0174207 A1 | 7/2009 | Lota |
| 2009/0211804 A1 | 8/2009 | Zhou et al. |
| 2009/0243172 A1 | 10/2009 | Ting et al. |
| 2009/0265896 A1 | 10/2009 | Beak |
| 2009/0309388 A1 | 12/2009 | Ellison |
| 2010/0000156 A1 | 1/2010 | Salhoff |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton et al. |
| 2010/0134128 A1 | 6/2010 | Hobbs |
| 2010/0147355 A1 | 6/2010 | Shimizu et al. |
| 2010/0162537 A1 | 7/2010 | Shiba |
| 2010/0232171 A1 | 9/2010 | Cannon |
| 2010/0247034 A1 | 9/2010 | Yi et al. |
| 2010/0263417 A1 | 10/2010 | Schoenow |
| 2010/0270745 A1 | 10/2010 | Hurlbert et al. |
| 2010/0307848 A1 | 12/2010 | Hashimoto |
| 2011/0012378 A1 | 1/2011 | Ueno et al. |
| 2011/0036542 A1 | 2/2011 | Woicke |
| 2011/0076588 A1 | 3/2011 | Yamaura |
| 2011/0083392 A1 | 4/2011 | Timko |
| 2011/0103884 A1 | 5/2011 | Shiomoto et al. |
| 2011/0119875 A1 | 5/2011 | Iwasaki |
| 2011/0131918 A1 | 6/2011 | Glynn |

(56) References Cited

U.S. PATENT DOCUMENTS

| | | |
|---|---|---|
| 2011/0154645 A1 | 6/2011 | Morgan |
| 2011/0175376 A1 | 7/2011 | Whitens et al. |
| 2011/0183152 A1 | 7/2011 | Lanham |
| 2011/0191990 A1 | 8/2011 | Beaulieu |
| 2011/0191993 A1 | 8/2011 | Forrest |
| 2011/0207024 A1 | 8/2011 | Bogumil et al. |
| 2011/0239418 A1 | 10/2011 | Huang |
| 2011/0296764 A1 | 12/2011 | Sawatani et al. |
| 2011/0311332 A1 | 12/2011 | Ishman |
| 2012/0000291 A1 | 1/2012 | Christoph |
| 2012/0000409 A1 | 1/2012 | Railey |
| 2012/0020726 A1 | 1/2012 | Jan |
| 2012/0073094 A1 | 3/2012 | Bishop |
| 2012/0112489 A1 | 5/2012 | Okimoto |
| 2012/0115010 A1 | 5/2012 | Smith et al. |
| 2012/0187812 A1 | 7/2012 | Gerst |
| 2012/0240363 A1 | 9/2012 | Lee |
| 2012/0251226 A1 | 10/2012 | Liu et al. |
| 2012/0261951 A1 | 10/2012 | Mildner et al. |
| 2012/0301067 A1 | 11/2012 | Morgan |
| 2012/0311829 A1 | 12/2012 | Dickinson |
| 2012/0321379 A1 | 12/2012 | Wang et al. |
| 2012/0324795 A1 | 12/2012 | Krajenke et al. |
| 2013/0010413 A1 | 1/2013 | Kim |
| 2013/0017038 A1 | 1/2013 | Kestner et al. |
| 2013/0019454 A1 | 1/2013 | Colombo et al. |
| 2013/0019455 A1 | 1/2013 | Morris |
| 2013/0027852 A1 | 1/2013 | Wang |
| 2013/0055822 A1 | 3/2013 | Frank |
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1 | 2/2014 | Morris et al. |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |
| 2014/0132023 A1 | 5/2014 | Watanabe et al. |
| 2014/0157578 A1 | 6/2014 | Morris et al. |
| 2014/0172112 A1 | 6/2014 | Marter |
| 2014/0175774 A1 | 6/2014 | Kansteiner |
| 2014/0199116 A1 | 7/2014 | Metten et al. |
| 2014/0202628 A1 | 7/2014 | Sreetharan et al. |
| 2014/0208561 A1 | 7/2014 | Colombo et al. |
| 2014/0208572 A1 | 7/2014 | Colombo et al. |
| 2014/0220267 A1 | 8/2014 | Morris et al. |
| 2014/0264206 A1 | 9/2014 | Morris |
| 2014/0292013 A1 | 10/2014 | Colombo et al. |
| 2014/0298638 A1 | 10/2014 | Colombo et al. |
| 2014/0298640 A1 | 10/2014 | Morris et al. |
| 2014/0298962 A1 | 10/2014 | Morris et al. |
| 2014/0300130 A1 | 10/2014 | Morris et al. |
| 2014/0301103 A1 | 10/2014 | Colombo et al. |
| 2014/0301777 A1 | 10/2014 | Morris et al. |
| 2014/0301778 A1 | 10/2014 | Morris et al. |
| 2014/0360824 A1 | 12/2014 | Morris et al. |
| 2014/0360826 A1 | 12/2014 | Morris et al. |
| 2014/0366326 A1 | 12/2014 | Colombo et al. |
| 2014/0369742 A1 | 12/2014 | Morris et al. |
| 2014/0369743 A1 | 12/2014 | Morris et al. |
| 2015/0016864 A1 | 1/2015 | Morris et al. |
| 2015/0016918 A1 | 1/2015 | Colombo |
| 2015/0023724 A1 | 1/2015 | Morris et al. |
| 2015/0043959 A1 | 2/2015 | Morris |
| 2015/0050068 A1* | 2/2015 | Morris .............. F16B 5/065 403/14 |
| 2015/0052725 A1 | 2/2015 | Morris et al. |
| 2015/0056009 A1 | 2/2015 | Morris |
| 2015/0063943 A1 | 3/2015 | Morris |
| 2015/0069779 A1 | 3/2015 | Morris et al. |
| 2015/0078805 A1 | 3/2015 | Morris et al. |
| 2015/0086265 A1 | 3/2015 | Morris |
| 2015/0093179 A1 | 4/2015 | Morris et al. |
| 2015/0098748 A1 | 4/2015 | Morris et al. |
| 2015/0115656 A1 | 4/2015 | Lungershausen |
| 2015/0135509 A1 | 5/2015 | Morris et al. |
| 2015/0164184 A1 | 6/2015 | Morris et al. |
| 2015/0165609 A1 | 6/2015 | Morris et al. |
| 2015/0165985 A1 | 6/2015 | Morris |
| 2015/0165986 A1 | 6/2015 | Morris |
| 2015/0167718 A1 | 6/2015 | Morris et al. |
| 2015/0175091 A1 | 6/2015 | Morris et al. |
| 2015/0175217 A1 | 6/2015 | Morris et al. |
| 2015/0176759 A1 | 6/2015 | Morris et al. |
| 2015/0194650 A1 | 7/2015 | Morris et al. |
| 2015/0197970 A1 | 7/2015 | Morris et al. |
| 2015/0232130 A1 | 8/2015 | Colombo |
| 2015/0232131 A1 | 8/2015 | Morris et al. |
| 2015/0291222 A1 | 10/2015 | Colombo et al. |
| 2015/0308538 A1 | 10/2015 | Morris et al. |
| 2015/0375798 A1 | 12/2015 | Morris et al. |

FOREIGN PATENT DOCUMENTS

| | | |
|---|---|---|
| CN | 1036250 A | 10/1989 |
| CN | 1062629 A | 7/1992 |
| CN | 1129162 A | 8/1996 |
| CN | 2285844 Y | 7/1998 |
| CN | 1205285 A | 1/1999 |
| CN | 1204744 A | 7/1999 |
| CN | 1328521 A | 12/2001 |
| CN | 1426872 A | 7/2003 |
| CN | 1496451 A | 5/2004 |
| CN | 2661972 Y | 12/2004 |
| CN | 2679409 Y | 2/2005 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |
| CN | 2872795 Y | 2/2007 |
| CN | 1933747 A | 3/2007 |
| CN | 2888807 Y | 4/2007 |
| CN | 1961157 A | 5/2007 |
| CN | 2915389 Y | 6/2007 |
| CN | 101005741 A | 7/2007 |
| CN | 200941716 Y | 8/2007 |
| CN | 200957794 Y | 10/2007 |
| CN | 101250964 A | 8/2008 |
| CN | 101390022 A | 3/2009 |
| CN | 201259846 Y | 6/2009 |
| CN | 201268336 Y | 7/2009 |
| CN | 201310827 Y | 9/2009 |
| CN | 201540513 U | 8/2010 |
| CN | 101821534 | 9/2010 |
| CN | 101930253 A | 12/2010 |
| CN | 201703439 U | 1/2011 |
| CN | 201737062 U | 2/2011 |
| CN | 201792722 U | 4/2011 |
| CN | 201818606 U | 5/2011 |
| CN | 201890285 U | 7/2011 |
| CN | 102144102 A | 8/2011 |
| CN | 102235402 A | 11/2011 |
| CN | 202024057 U | 11/2011 |
| CN | 202079532 U | 12/2011 |
| CN | 102313952 A | 1/2012 |
| CN | 202132326 U | 2/2012 |
| CN | 102540855 A | 7/2012 |
| CN | 102756633 | 10/2012 |
| CN | 102803753 A | 11/2012 |
| CN | 102817892 A | 12/2012 |
| CN | 102869891 A | 1/2013 |
| CN | 102886753 A | 1/2013 |
| CN | 102904128 A | 1/2013 |
| CN | 202686206 U | 1/2013 |
| CN | 102918315 A | 2/2013 |
| CN | 102939022 A | 2/2013 |
| CN | 202764872 U | 3/2013 |
| CN | 202987018 U | 6/2013 |

(56) References Cited

FOREIGN PATENT DOCUMENTS

| | | |
|---|---|---|
| CN | 103201525 A | 7/2013 |
| CN | 103206595 A | 7/2013 |
| CN | 103206596 A | 7/2013 |
| CN | 203189459 U | 9/2013 |
| CN | 203344856 U | 12/2013 |
| CN | 104100609 A | 10/2014 |
| CN | 203991175 U | 12/2014 |
| DE | 1220673 B | 7/1966 |
| DE | 2527023 A1 | 12/1976 |
| DE | 2736012 A1 | 2/1978 |
| DE | 2703897 A1 | 8/1978 |
| DE | 2809746 A1 | 9/1979 |
| DE | 3008990 A1 | 9/1980 |
| DE | 3704190 A1 | 12/1987 |
| DE | 3711696 A1 | 10/1988 |
| DE | 3805693 A1 | 2/1989 |
| DE | 3815927 | 11/1989 |
| DE | 9109276 U1 | 7/1991 |
| DE | 4002443 A1 | 8/1991 |
| DE | 4111245 A1 | 10/1991 |
| DE | 9201258 U1 | 3/1992 |
| DE | 29714892 U1 | 10/1997 |
| DE | 29800379 U1 | 5/1998 |
| DE | 69600357 T2 | 12/1998 |
| DE | 10234253 B3 | 4/2004 |
| DE | 10333540 A1 | 2/2005 |
| DE | 60105817 T2 | 2/2006 |
| DE | 202007006175 U1 | 8/2007 |
| DE | 102008005618 A1 | 7/2009 |
| DE | 102008063920 A1 | 9/2009 |
| DE | 102008047464 A1 | 4/2010 |
| DE | 102010028323 A1 | 11/2011 |
| DE | 102011050003 A1 | 10/2012 |
| DE | 102012212101 B3 | 7/2013 |
| DE | 102013003028 A1 | 3/2014 |
| EP | 0118796 | 9/1984 |
| EP | 0616140 A2 | 9/1994 |
| EP | 1132263 A1 | 9/2001 |
| EP | 1243471 A2 | 9/2002 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 1452745 A1 | 9/2004 |
| EP | 1550818 A1 | 7/2005 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| FR | 2750177 A2 | 12/1997 |
| FR | 2942749 A1 | 9/2010 |
| FR | 2958696 A1 | 10/2011 |
| GB | 155838 | 3/1922 |
| GB | 994891 | 6/1965 |
| GB | 2175626 A | 12/1986 |
| GB | 2281950 A | 3/1995 |
| GB | 2348924 A | 10/2000 |
| IE | 9201258 U1 | 3/1992 |
| JP | S6054264 A | 3/1985 |
| JP | H08200420 A | 8/1996 |
| JP | H0942233 A | 2/1997 |
| JP | 2000010514 A | 1/2000 |
| JP | 2000287717 A | 10/2000 |
| JP | 2001141154 A | 5/2001 |
| JP | 2001171554 A | 6/2001 |
| JP | 2003158387 A | 5/2003 |
| JP | 2003314515 A | 11/2003 |
| JP | 2005268004 | 9/2005 |
| JP | 2006205918 | 8/2006 |
| JP | 2008307938 A | 12/2008 |
| JP | 2009084844 | 4/2009 |
| JP | 2009187789 A | 8/2009 |
| JP | 2011085174 A | 4/2011 |
| JP | 2012060791 A | 3/2012 |
| JP | 2012112533 A | 6/2012 |
| KR | 20030000251 A1 | 1/2003 |
| KR | 100931019 B1 | 12/2009 |
| WO | 9602963 A1 | 2/1996 |
| WO | 9822739 A1 | 5/1998 |
| WO | 0055517 A2 | 3/2000 |
| WO | 0132454 A3 | 11/2001 |
| WO | 2004010011 | 1/2004 |
| WO | 2007126201 A1 | 11/2007 |
| WO | 2008140659 A1 | 11/2008 |
| WO | 2010105354 A1 | 9/2010 |
| WO | 2011025606 | 3/2011 |
| WO | 2013088447 A1 | 6/2013 |
| WO | 2013191622 A1 | 12/2013 |

OTHER PUBLICATIONS

"Elastic Averaging in Flexture Mechanisms: A Multi-Beam Paralleaogram Flexture Case-Study" by Shorya Awtar and EDIP SEVINCER, Proceedings of IDETC/CIE 2006, Paper DETC2006-99752, American Society of Mechanical Engineers (ASME), Sep. 2006.

"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.

"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.

"Passive Alignment of Micro-Fluidic Chips Using the Principle of Elastic Averaging" by Sitanshu Gurung, Thesis, Louisiana State University, Dept. of Mechanical Engineering, Dec. 2007.

"Precision Connector Assembly Using Elastic Averaging" by Patrick J. Willoughby and Alexander H. Slocum, Massachusetts Institute of Technology (MIT), Cambridge, MA, American Society for Precision Engineering, 2004.

U.S. Appl. No. 13/752,449, filed on Jan. 29, 2013, entitled "Elastic Insert Alignment Assembly and Method of Reducing Positional Variation", inventors: Steven E. Morris and Michael D. Richardson.

U.S. Appl. No. 13/755,759, filed on Jan. 31, 2013, entitled "Elastic Alignment Assembly for Aligning Mated Components and Method of Reducing Positional Variation", inventors: Joel Colombo, Michael D. Richardson, and Steven E. Morris.

U.S. Appl. No. 13/851,222, filed on Mar. 27, 2013, entitled "Elastically Averaged Alignment System", inventors: Joel Colombo and Steven E. Morris.

U.S. Appl. No. 13/855,928, filed on Apr. 3, 2013, entitled "Elastic Averaging Alignment System, Method of Making the Same and Cutting Punch Therefor", inventors: Steven E. Morris, Jennifer P. Lawall, Joel Colombo, and Jeffrey L. Konchan.

U.S. Appl. No. 13/856,888, filed on Apr. 4, 2013, entitled "Elastic Retaining Assembly for Matable Components and Method of Assembling", inventors: Steven E. Morris, Jennifer P. Lawall, Joel Colombo, and Toure D. Lee.

U.S. Appl. No. 13/856,927, filed on Apr. 4, 2013, entitled "Elastic Tubular Attachment Assembly for Mating Components and Method of Mating Components", inventors: Steven E. Morris and Jennifer P. Lawall.

U.S. Appl. No. 13/856,956, filed on Apr. 4, 2013, entitled "Elastic Clip Retaining Arrangement and Method of Mating Structures with an Elastic Clip Retaining Arrangement", inventors: Joel Colombo, Steven E. Morris and Jeffrey L. Konchan.

U.S. Appl. No. 13/856,973, filed on Apr. 4, 2013, entitled "Elastically Deformable Flange Locator Arrangement and Method of Reducing Positional Variation", inventors: Joel Colombo, Steven E. Morris and Michael D. Richardson.

U.S. Appl. No. 13/858,478, filed on Apr. 8, 2013, entitled "Elastic Mating Assembly and Method of Elastically Assembling Matable Components", inventors: Steven E. Morris and Jennifer P. Lawall.

U.S. Appl. No. 13/859,109, filed on Apr. 9, 2013, entitled "Elastic Retaining Arrangement for Jointed Components and Method of

(56) References Cited

OTHER PUBLICATIONS

Reducing a Gap Between Jointed Components," inventors: Steven E. Morris, James M. Kushner, Victoria L. Enyedy, Jennifer P. Lawall, and Piotr J. Ogonek.

U.S. Appl. No. 13/915,132, filed on Jun. 11, 2013, entitled "Elastically Deformable Energy Management Arrangement and Method of Managing Energy Absorption," inventors: Steven E. Morris, Randy A. Johnson and Jennifer P. Lawall.

U.S. Appl. No. 13/915,177, filed on Jun. 11, 2013, entitled "Elastically Deformable Energy Management Assembly and Method of Managing Energy Absorption," inventors: Steven E. Morris, Jennifer P. Lawall, and Randy Johnson.

U.S. Appl. No. 13/917,005, filed on Jun. 13, 2013, entitled "Elastic Attachment Assembly and Method of Reducing Positional Variation and Increasing Stiffness," inventors: Steven E. Morris and Jennifer P. Lawall.

U.S. Appl. No. 13/917,074, filed on Jun. 13, 2013, entitled "Elastically Deformable Retaining Hook for Components to be Mated Together and Method of Assembling", inventors: Joel Colombo, Jeffrey L. Konchan, Steven E. Morris, and Steve J. Briggs.

U.S. Appl. No. 13/918,183, filed on Jun. 14, 2013, entitled "Elastic Retaining Assembly for Matable Components and Method of Assembling," inventors: Steven E. Morris and Jennifer P. Lawall.

U.S. Appl. No. 13/939,503, filed on Jul. 11, 2013, entitled "Elastically Averaged Alignment Systems and Methods," inventor: Joel Colombo.

U.S. Appl. No. 13/940,912, filed on Jul. 12, 2013, entitled "Alignment Arrangement for Mated Components and Method", inventors: Steven E. Morris and Jennifer P. Lawall.

U.S. Appl. No. 13/945,231, filed on Jul. 18, 2013, entitled "Lobular Elastic Tube Alignment System for Providing Precise Four-Way Alignment of Components", Inventors: Steven E. Morris and Jennifer P. Lawall.

U.S. Appl. No. 13/954,198, filed on Jul. 30, 2013, entitled "Elastic Alignment and Retention System and Method," inventors: Steven E. Morris, Edward D. Groninger, and Raymond J. Chess.

U.S. Appl. No. 13/966,523, filed on Aug. 14, 2013, entitled "Elastically Averaged Alignment Systems and Methods Thereof," inventors: Steven E. Morris, Jennifer P. Lawall and Joel Colombo.

U.S. Appl. No. 13/973,587, filed on Aug. 22, 2013, entitled "Elastic Averaging Alignment System and Method," inventors: Steven E. Morris and Jennifer P. Lawall.

U.S. Appl. No. 13/974,729, filed on Aug. 23, 2013, entitled "Elastic Averaging Snap Member Aligning and Fastening System", inventors: Steven E. Morris and Jennifer P. Lawall.

U.S. Appl. No. 14/012,205, filed on Aug. 28, 2013, entitled "Elastically Deformable Alignment Fastener and System," inventors: Steven E. Morris, Marc J. Tahnoose, Michael E. McGuire and Jennifer P. Lawall.

U.S. Appl. No. 14/021,282, filed on Sep. 9, 2013, entitled "Elastic Tube Alignment and Fastening System for Providing Precise Alignment and Fastening of Components," inventors: Steven E. Morris and Jennifer P. Lawall.

U.S. Appl. No. 14/031,647, filed on Sep. 19, 2013, entitled "Elastically Averaged Alignment Systems and Methods," inventors: Steven E. Morris, Joel Colombo, Jennifer P. Lawall, Jeffrey L. Konchan, and Steve J. Briggs.

U.S. Appl. No. 14/038,241, filed on Sep. 26, 2013, entitled "Serviceable Aligning and Self-Retaining Elastic Arrangement for Mated Components and Method," inventors: Steven E. Morris, Jennifer P. Lawall and Joel Colombo.

U.S. Appl. No. 14/039,614, filed on Sep. 27, 2013, entitled "Elastically Averaged Alignment Systems and Methods," inventor: Steven E. Morris.

U.S. Appl. No. 14/044,199, filed on Oct. 2, 2013, entitled "Lobular Elastic Tube Alignment and Retention System for Providing Precise Alignment of Components," inventors: Steven E. Morris and Jennifer P. Lawall.

U.S. Appl. No. 14/044,207, filed on Oct. 2, 2013, entitled "Elastic Aperture Alignment System for Providing Precise Four-Way Alignment of Components," inventors: Steven E. Morris and Jennifer P. Lawall.

U.S. Appl. No. 14/045,463, filed on Oct. 3, 2013, entitled "Elastically Averaged Alignment Systems and Methods," inventors: Steven E. Morris and Jennifer P. Lawall.

U.S. Appl. No. 14/081,361, filed on Nov. 15, 2013, entitled "Elastically Deformable Clip and Method," inventors: Steven E. Morris, Jennifer P. Lawall and Jeffrey M. Gace.

U.S. Appl. No. 14/104,321, filed on Dec. 12, 2013, entitled "Alignment and Retention System for a Flexible Assembly," inventors: Steven E. Morris and Jennifer P. Lawall.

U.S. Appl. No. 14/104,327, filed on Dec. 12, 2013, entitled "Self-Retaining Alignment System for Providing Precise Alignment and Retention of Components," inventors: Steven E. Morris, Jennifer P. Lawall and Toure D. Lee.

U.S. Appl. No. 14/104,333, filed on Dec. 12, 2013, entitled "Alignment System for Providing Precise Alignment and Retention of Components of a Sealable Compartment, " inventors: Steven E. Morris, Christopher J. Georgi, Jennifer P. Lawall and Gordan N. Noll.

U.S. Appl. No. 14/104,541, filed on Dec. 12, 2013, entitled "Alignment and Retention System for Providing Precise Alignment and Retention of Components," inventors: Steven E. Morris and Jennifer P. Lawall.

U.S. Appl. No. 14/104,549, filed on Dec. 12, 2013, entitled "Alignment System for Providing Alignment of Components Having Contoured Features," inventors: Steven E. Morris and Jennifer P. Lawall.

U.S. Appl. No. 14/108,921, filed on Dec. 17, 2013, entitled "Elastically Averaged Alignment Systems and Methods Thereof," inventors: Steven E. Morris and Jennifer P. Lawall.

U.S. Appl. No. 14/108,931, filed on Dec. 17, 2013, entitled "Elastically Averaged Strap Systems and Methods," inventors: Steven E. Morris and Jennifer P. Lawall.

U.S. Appl. No. 14/109,296, filed on Dec. 17, 2013, entitled "Fastener for Operatively Coupling Matable Components, " inventors: Steven E. Morris and Jennifer P. Lawall.

U.S. Appl. No. 14/134,622, filed on Dec. 19, 2013, entitled "Elastic Averaging Alignment Member," inventors: Steven E. Morris and Jennifer P. Lawall.

U.S. Appl. No. 14/134,801, filed on Dec. 19, 2013, entitled "Elastically Averaged Alignment Systems and Methods," inventors: Steven E. Morris and Jennifer P. Lawall.

U.S. Appl. No. 14/134,844, filed on Dec. 19, 2013, entitled "Elastically Deformable Module Installation Assembly," inventors: Steven E. Morris and Jennifer P. Lawall.

U.S. Appl. No. 14/134,888, filed on Dec. 19, 2013, entitled "Elastic Retaining Assembly and Method," inventors: Steven E. Morris and Jennifer P. Lawall.

U.S. Appl. No. 14/136,502, filed on Dec. 20, 2013, entitled "Elastically Averaged Alignment Systems and Methods," inventors: Timothy A. Kiester, Steven E. Morris, Kenton L. West, Scott J. Fast, and Evan Phillips.

U.S. Appl. No. 14/151,279, filed on Jan. 9, 2014, entitled "Elastically Averaged Alignment Systems and Methods," inventors: Steven E. Morris and Jennifer P. Lawall.

U.S. Appl. No. 14/153,741, filed on Jan. 13, 2014, entitled "Elastically Averaged Assembly for Closure Applications," inventors: Steven E. Morris, Jeffrey A. Abell, Jennifer P. Lawall, and Jeffrey L. Konchan.

U.S. Appl. No. 14/180,882, filed on Feb. 4, 2014, entitled "Elastic Tube Alignment System for Precisely Locating Components," inventor: Steven E. Morris.

U.S. Appl. No. 14/181,142, filed on Feb. 14, 2014, entitled "Elastic Tube Alignment System for Precisely Locating Components," inventor: Steven E. Morris.

U.S. Appl. No. 14/185,422, filed on Feb. 20, 2014, entitled "Elastically Averaged Alignment Systems and Methods," inventors: Joel Colombo, Steven E. Morris, Jennifer P. Lawall and Ashish M. Gollapalli.

(56) References Cited

OTHER PUBLICATIONS

U.S. Appl. No. 14/185,472, filed on Feb. 20, 2014, entitled "Elastically Averaged Alignment Systems and Method," inventors: Steven E. Morris, Jennifer P. Lawall and Kee Hyuk Im.

U.S. Appl. No. 14/231,395, filed on Mar. 31, 2014, entitled "Elastically Averaged Alignment Systems and Methods," inventors: Joel Colombo, Steven E. Morris, Jennifer P. Lawall, and Ashish M. Gollapalli.

U.S. Appl. No. 14/249,746, filed on Apr. 10, 2014, entitled "Elastically Averaged Alignment Systems and Methods," inventors: Joel Colombo and Catherine A. Ostrander.

U.S. Appl. No. 14/259,747, filed on Apr. 23, 2014, entitled "System for Elastically Averaging Assembly of Components," inventors: Steven E. Morris and Jennifer P. Lawall.

Cross-sectional view of a prior art infrared welded assembly of BMW, Munich, Germany. Believed on the market since about Jan. 1, 2010.

Office Action for Chinese Patent Application for Invention No. 201410516462.9 dated Mar. 3, 2016 is related to U.S. Appl. No. 14/044,199; 5 pages.

Rojas, F.E., et al., "Kinematic Coupling for Precision Fixturing & Assembly" MIT Precision Engineering Research Group, Apr. 2013; 24 pgs.

Slocum, A.H., et al., "Kinematic and Elastically Averaged Joints: Connecting the Past, Present and Future" International Symposium on Ultraprecision Engineering and Nanotechnology, Tokyo, Japan, Mar. 13, 2013; 4 pgs.

Willoughby, P., "Elastically Averaged Precision Alignment", Degree of Doctor of Philosophy in Mechanical Engineering Dissertation, Massachusetts Institute of Technology, 2005; 158 pgs.

* cited by examiner

LOBULAR ELASTIC TUBE ALIGNMENT AND RETENTION SYSTEM FOR PROVIDING PRECISE ALIGNMENT OF COMPONENTS

FIELD OF THE INVENTION

The subject invention relates to the art of alignment systems, more particularly to an elastically averaged alignment system, and even more particularly to an elastically averaged alignment system providing two-way or four-way alignment, or alignment and retention, of mating components on which the alignment system is incorporated.

BACKGROUND

Currently, components, particularly vehicular components such as those found in automotive vehicles, which are to be mated together in a manufacturing process are mutually located with respect to each other by alignment features that are oversized and/or undersized to provide spacing to freely move the components relative to one another to align them without creating an interference therebetween that would hinder the manufacturing process. One example includes two-way and/or four-way male alignment features, typically upstanding bosses, which are received into corresponding female alignment features, typically apertures in the form of holes or slots. There is a clearance between the male alignment features and their respective female alignment features which is predetermined to match anticipated size and positional variation tolerances of the male and female alignment features as a result of manufacturing (or fabrication) variances. As a result, significant positional variation can occur between the mated first and second components having the aforementioned alignment features, which may contribute to the presence of undesirably large variation in their alignment, particularly with regard to the gaps and spacing between them. In the case where these misaligned components are also part of another assembly, such misalignments can also affect the function and/or aesthetic appearance of the entire assembly. Regardless of whether such misalignment is limited to two components or an entire assembly, it can negatively affect function and result in a perception of poor quality.

To align and secure components, the aforementioned male and female alignment features may be employed in combination with separate retention components, such as snap-fit features for example, that serve to secure the components to each other. In such an assembly, the mating components are located relative to each other by the alignment features, and are fixed relative to each other by the separate retention components. Use of separate alignment features and retention components, one for alignment and the other for securement, may limit the effectiveness of each on a given assembly, as the alignment features cannot be employed where the retention components are employed.

Accordingly, the art of alignment systems can be enhanced by providing an alignment system or mechanism that can ensure precise two-way or four-way alignment, or alignment and retention, of two or more components via elastic averaging of a single elastically deformable alignment element disposed in mating engagement with a corresponding alignment feature.

SUMMARY OF THE INVENTION

In an exemplary embodiment of the invention, an elastically averaged alignment system is provided having a first component and a second component. The first component includes a first alignment member and an elastically deformable alignment element fixedly disposed with respect to the first alignment member. The second component includes a second alignment member and an alignment aperture fixedly disposed with respect to the second alignment member. The elastically deformable alignment element is configured and disposed to interferingly, deformably and matingly engage the alignment aperture. The elastically deformable alignment element includes a lobular hollow tube having four lobes, with a slotted retention feature on each of two opposing lobes that extend from an outer surface of the hollow tube radially inward toward a central axis of the hollow tube. Portions of the elastically deformable alignment element when inserted into the alignment aperture elastically deform to an elastically averaged final configuration that aligns the first alignment member with the second alignment member in at least two planar orthogonal directions. Each of the slotted retention features engages with an edge of the alignment aperture.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
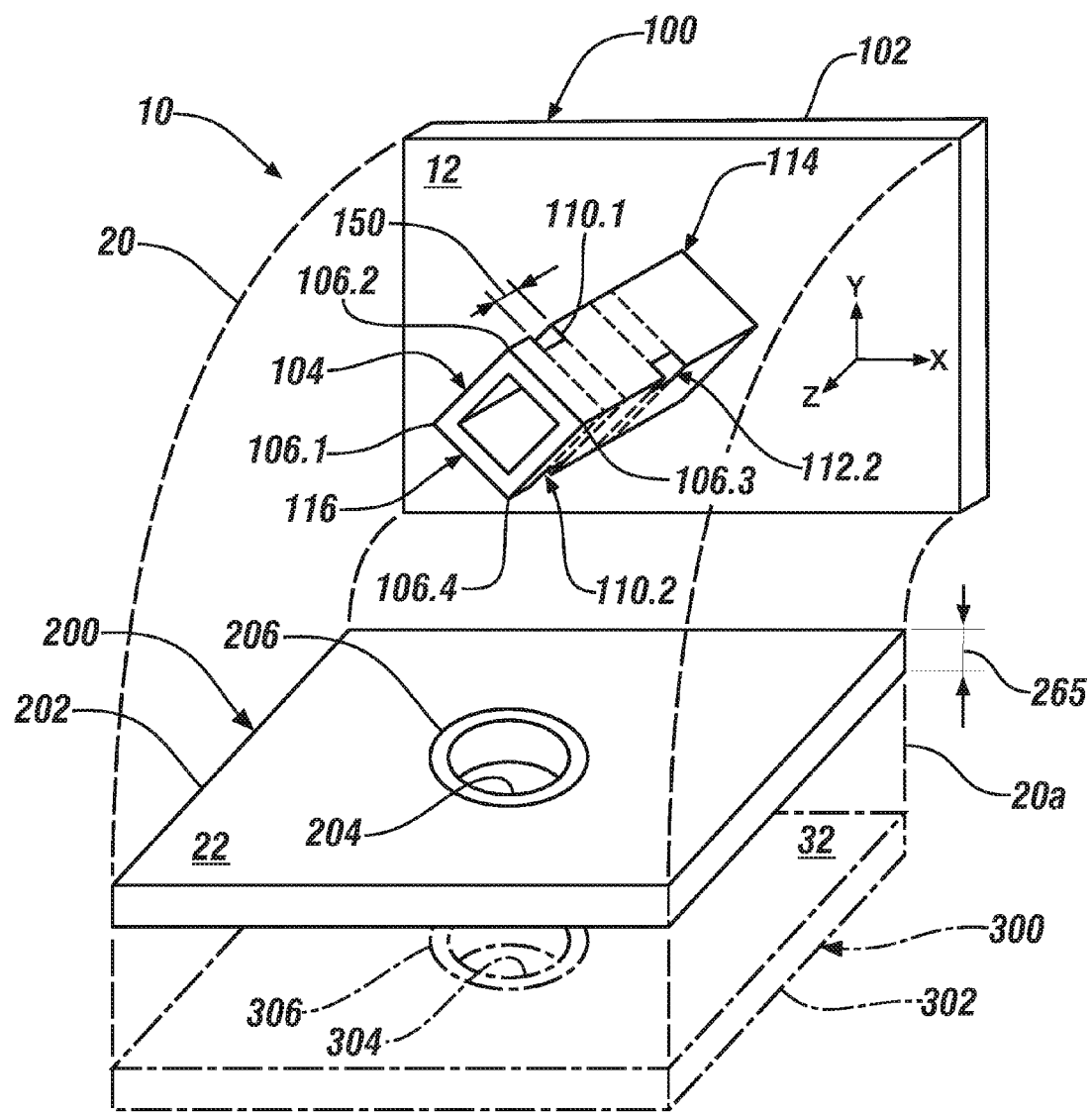
FIG. 1 depicts a disassembled assembly view of an elastically averaged alignment and retention system having a first, a second, and optionally a third component, an elastically deformable alignment element in the form of a quad-lobular hollow tube, circular alignment apertures, and two pairs of slotted retention features disposed in different parallel planes on the quad-lobular hollow tube, in accordance with an embodiment of the invention.

The following description is merely exemplary in nature and is not intended to limit the present disclosure, its application or uses. For example, the embodiments shown comprise vehicle components but the alignment system may be used with any suitable components to provide elastic averaging for precision location and alignment of all manner of mating components and component applications, including many industrial, consumer product (e.g., consumer electronics, various appliances and the like), transportation, energy and aerospace applications, and particularly including many other types of vehicular components and applications, such as various interior, exterior and under hood vehicular components and applications. It should be understood that throughout the drawings, corresponding reference numerals indicate like or corresponding parts and features.

As used herein, the term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. In some embodiments, the elastically deformable component configured to have the at least one feature and associated mating feature disclosed herein may require more than one of such features, depending on the requirements of a particular embodiment. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187,675, now U.S. Publication No. U.S. 2013-0019455, the disclosure of which is incorporated by reference herein in its entirety. The embodiments disclosed above provide the ability to convert an existing component that is not compatible with the above-described elastic averaging principles, or that would be further aided with the inclusion of a two-way or four-way elastic averaging alignment, or alignment and retention, system as herein disclosed, to an assembly that does facilitate elastic averaging and the benefits associated therewith.

Any suitable elastically deformable material may be used for the mating components and alignment features disclosed herein and discussed further below, particularly those materials that are elastically deformable when formed into the features described herein. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS). The material may be in any form and formed or manufactured by any suitable process, including stamped or formed metal, composite or other sheets, forgings, extruded parts, pressed parts, castings, or molded parts and the like, to include the deformable features described herein. The elastically deformable alignment features and associated component may be formed in any suitable manner. For example, the elastically deformable alignment features and the associated component may be integrally formed, or they may be formed entirely separately and subsequently attached together. When integrally formed, they may be formed as a single part from a plastic injection molding machine, for example. When formed separately, they may be formed from different materials to provide a predetermined elastic response characteristic, for example. The material, or materials, may be selected to provide a predetermined elastic response characteristic of any or all of the elastically deformable alignment features, the associated component, or the mating component. The predetermined elastic response characteristic may include, for example, a predetermined elastic modulus.

As used herein, the term vehicle is not limited to just an automobile, truck, van or sport utility vehicle, but includes any self-propelled or towed conveyance suitable for transporting a burden.

In accordance with an exemplary embodiment of the invention, and with reference to FIG. 1, an elastically averaging alignment system 10 includes a first component 100 having a first alignment member 102 and an elastically deformable alignment element 104 fixedly disposed with respect to the first alignment member 102, and a second component 200 having a second alignment member 202 and an alignment aperture 204 fixedly disposed with respect to the second alignment member 202. In an embodiment, the alignment aperture 204 is a circular aperture (herein referred to by reference numeral 204), as illustrated in FIGS. 1-4, for providing elastically averaged four-way alignment and retention. In another embodiment, the alignment aperture 204 is an elongated slotted aperture (herein referred to by reference numeral 204a), which will be discussed in more detail with reference to FIGS. 5-7, for providing elastically averaged two-way alignment and retention. The major axis of the elongated slotted aperture may be oriented along the x-axis or the y-axis, depending on which direction the elastically averaged two-way alignment and retention of the components needs to be controlled. The elastically deformable alignment element 104 is configured and disposed to interferingly, deformably and matingly engage the alignment feature 204, in a manner discussed in more detail below, to precisely align the first component 100 with the second component 200 in either two directions or four directions, such as the +/−x-direction and/or the +/−y-direction of an orthogonal coordinate system, for example, which are herein referred to as two-way alignment and four-way alignment, respectively.

For discussion purposes, the mating side of the first alignment member 102 visible in FIG. 1 is labeled 12, and the mating side of the second alignment member 202 visible in FIG. 1 is labeled 22. The non-visible sides of the first and second alignment members 102, 202 that are hidden from view in FIG. 1 are herein referred to by reference labels 11 and 21, respectively. For discussion purposes, the 12 and 22 sides are herein referred to as front views, and the 11 and 21 sides are herein referred to as rear views. Dashed lines 20 represent direction lines that may be traversed as the first and second components 100, 200 are assembled with respect to each other.

In an embodiment, the elastically deformable alignment element 104 is a lobular hollow tube (also herein referred to by reference numeral 104) having four outwardly oriented lobes 106.1, 106.2, 106.3, 106.4 relative to a central axis 108 of the lobular hollow tube 104 (best seen with reference to FIG. 2), and the alignment feature is a circular aperture 204. In an embodiment, a chamfer 206 circumscribes the circular aperture 204 to facilitate insertion of the elastically deformable alignment element 104 into the circular aperture 204. In an embodiment, the lobular hollow tube 104 may also be herein referred to as a quad-lobular hollow tube, or a diamond-shaped lobular hollow tube. In an embodiment, an outer profile of a cross section of the lobular hollow tube 104 has sides that form a rhombus or a square shape.

In an embodiment, the lobular hollow tube 104 has a proximal end 114 proximate the first alignment member 102, and a distal end 116 spaced apart from the proximal end 114. In an embodiment, the distal end 116 has a taper 118 (best seen with reference to FIGS. 9 and 10) to facilitate insertion of the elastically deformable alignment element 104 into the alignment aperture 204.

In an embodiment, the lobular hollow tube 104 includes slotted retention features 110.1, 110.2, 112.1, 112.2 that extend from an outer surface of the lobular hollow tube 104 radially inward toward the central axis 108 of the lobular hollow tube 104, and may extend only partially through the wall thickness of the lobular hollow tube 104, or completely through the wall thickness. While the several figures described herein depicted slotted retention features that extend completely through the lobular hollow tube, it will be appreciated that the scope of the invention is not so limited and also encompasses partial slots or notches that do not extend completely through the lobular hollow tube, but still function in a manner consistent with the disclosure provided herein. In an embodiment, slotted retention features 110.1 and 110.2 are disposed on two opposing lobes (corners) of the lobular hollow tube 104, and slotted retention features 112.1 and 112.2 are disposed on the other two opposing lobes (corners) of the lobular hollow tube 104. While FIG. 1 depicts slotted retention features 110.1, 110.2, 112.1, 112.2 for providing retention as well as alignment, it will be appreciated that the scope of the invention is not so limited and also encompasses a quad-lobular hollow tube 104 absent the slotted retention features 110.1, 110.2, 112.1, 112.2 for providing alignment without retention.

Figure 5:
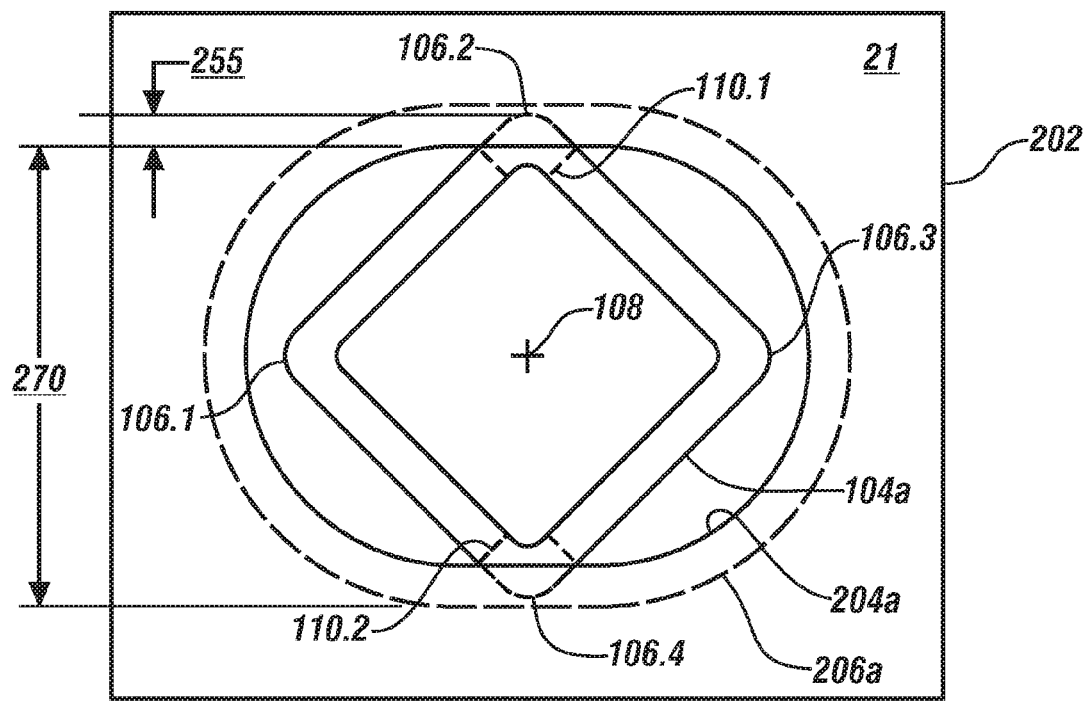
FIG. 5 depicts a rear plan view of the first and second components of FIG. 1, but with an elongated slotted aperture in place of a circular aperture, and only one pair of slotted retention features, in a first pre-engagement state of assembly with respect to each, in accordance with an embodiment of the invention.
Figure 6:
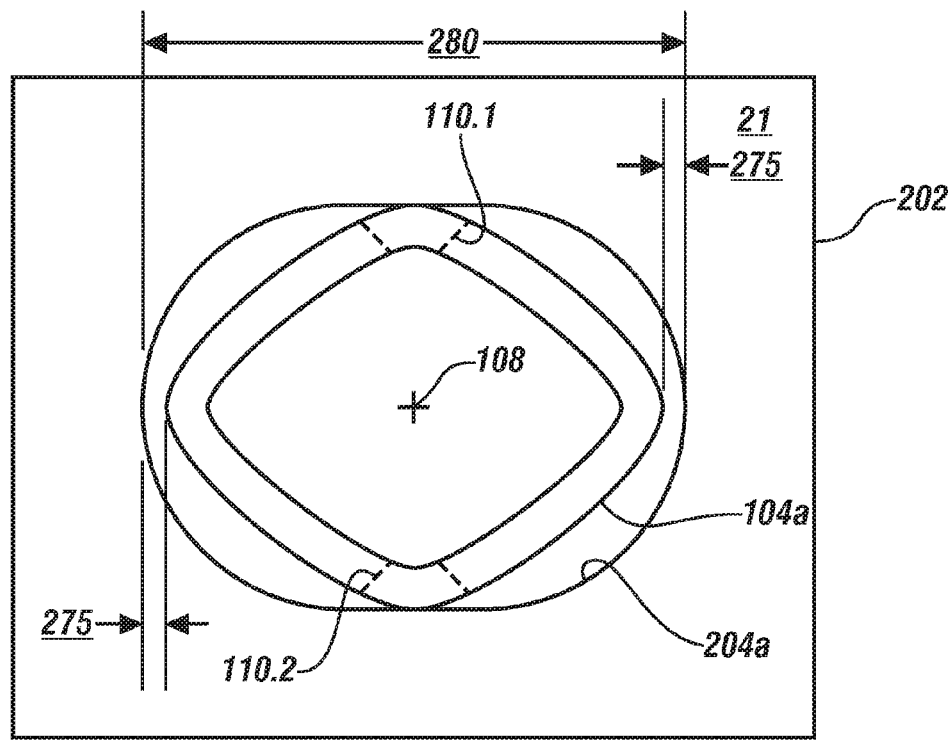
FIG. 6 depicts a rear plan view of the first and second components of FIG. 5 in a second partial-engagement state of assembly with respect to each other, in accordance with an embodiment of the invention.
Figure 7:
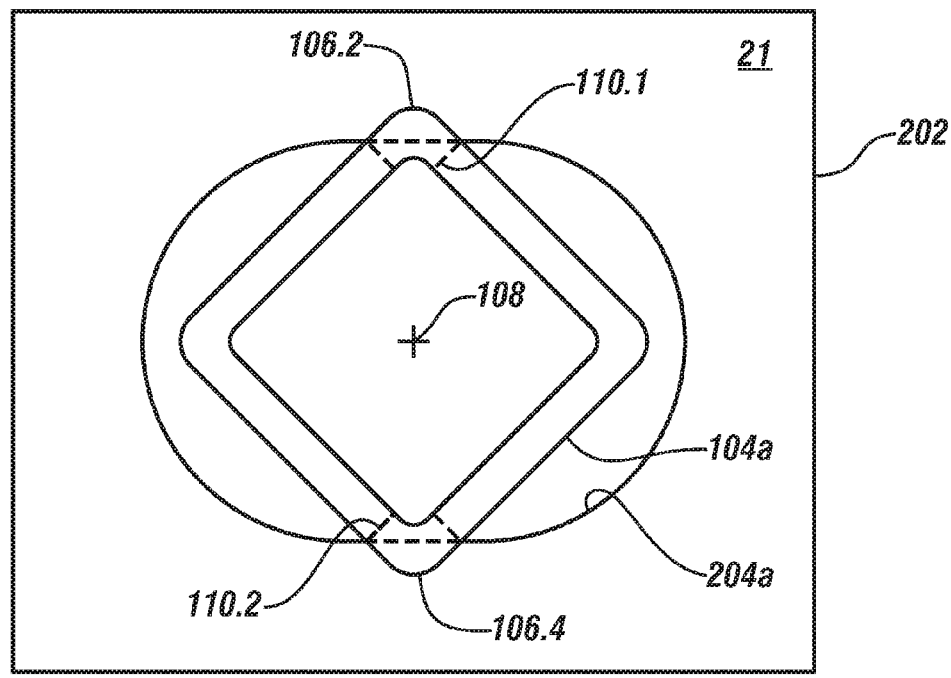
FIG. 7 depicts a rear plan view of the first and second components of FIG. 6 in a third full-engagement state of assembly with respect to each other, in accordance with an embodiment of the invention.

In a first embodiment, the opposing slotted retention features 112.1, 112.2 are absent, and the opposing slotted retention features 110.1, 110.2 are disposed in a same plane oriented perpendicular to the central axis 108 of the lobular hollow tube 104a, to provide an elastically averaged two-way alignment and retention system for example (see FIGS. 5-7 for example).

Figure 2:
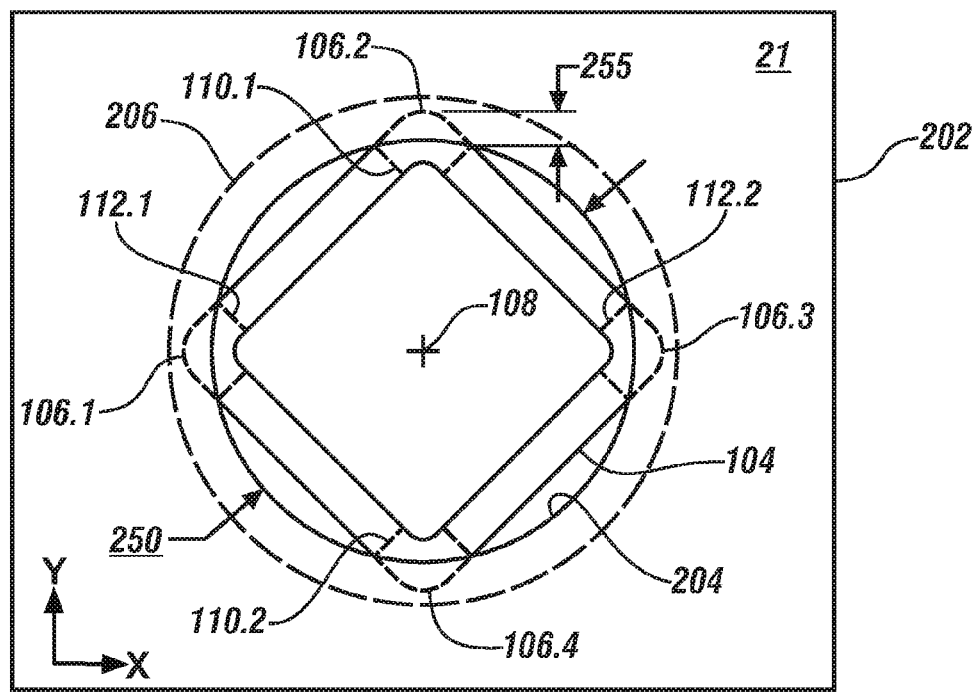
FIG. 2 depicts a rear plan view of the first and second components of FIG. 1, but with all four slotted retention features disposed in a same plane, in a first pre-engagement state of assembly with respect to each, in accordance with an embodiment of the invention.
Figure 3:
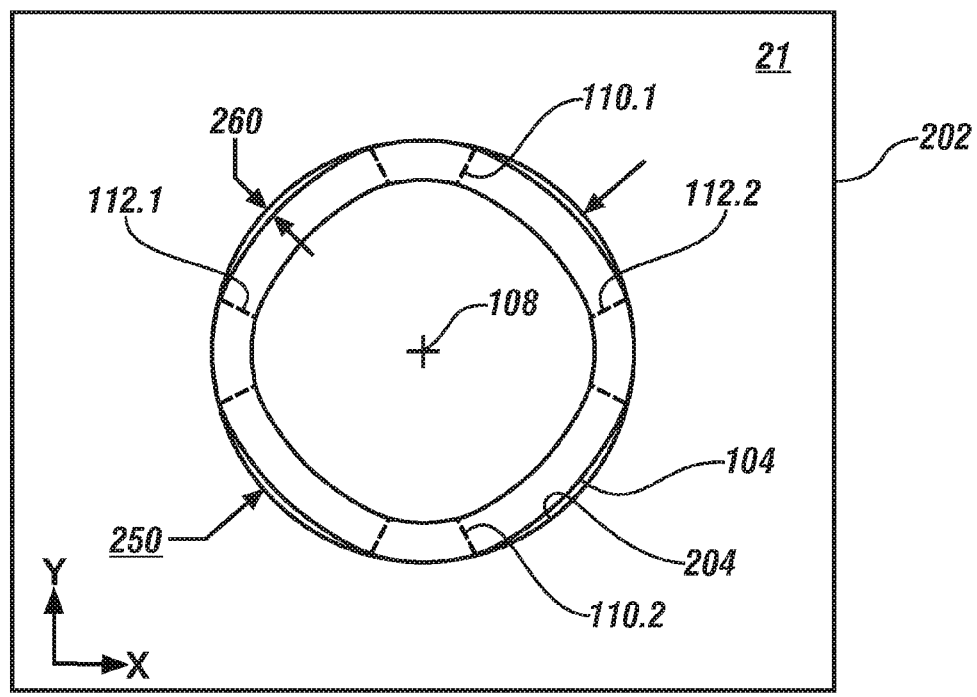
FIG. 3 depicts a rear plan view of the first and second components of FIG. 2 in a second partial-engagement state of assembly with respect to each, in accordance with an embodiment of the invention.
Figure 4:
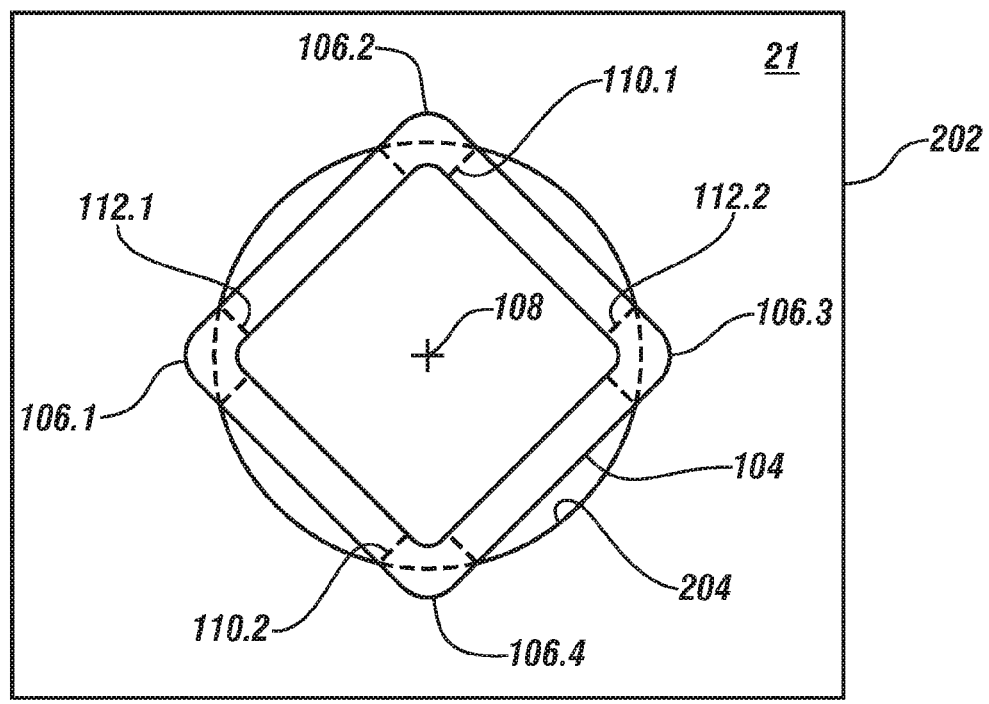
FIG. 4. depicts a rear plan view of the first and second components of FIG. 3 in a third full-engagement state of assembly with respect to each, in accordance with an embodiment of the invention.

In a second embodiment, the slotted retention features 110.1, 110.2, 112.1, 112.2 are all disposed in a same plane oriented perpendicular to the central axis 108 of the lobular hollow tube 104, to provide an elastically averaged four-way alignment and retention system for example (see FIGS. 2-4 for example).

In a third embodiment, a first pair of the slotted retention features 110.1, 110.2 are disposed in a first plane oriented perpendicular to the central axis of the lobular hollow tube 104, and the second pair of slotted retention features 112.1, 112.2 are disposed in a second plane oriented perpendicular to the central axis 108 of the lobular hollow tube 104, where the first and second planes are different from and spaced apart from each other, to provide an elastically averaged alignment and retention system for three components for example (see FIGS. 1 and 8-10 for example).

Accordingly and as discussed above, an embodiment may include just one pair of opposing slotted retention features 110.1, 110.2 (or 112.1, 112.1) to provide elastically averaged two-way alignment and retention when engaged with an elongated slotted aperture 204a (best seen with reference to FIGS. 5-7), another embodiment may include all four slotted retention features 110.1. 110.2, 112.1, 112.2 disposed in a same plane to provide elastically averaged four-way alignment and retention when engaged with a circular aperture 204 (best seen with reference to FIGS. 2-4), and another embodiment may include pairs of the slotted retention features 110.1, 110.2 and 112.1, 112.2 disposed in different planes to provide elastically averaged two-way alignment and retention of three components, which will be discussed in more detail below with reference to FIGS. 1 and 8-10.

Portions of the elastically deformable alignment element (lobular hollow tube) 104, when inserted into the alignment aperture 204, elastically deform to an elastically averaged final configuration that aligns the first alignment member 102 with the second alignment member 202 in two or four planar orthogonal directions, depending on whether one or two pairs of the slotted retention features 110.1, 110.2, 112.1, 112.2 are employed, and whether the alignment aperture is a circular alignment aperture 204 or an elongated slotted alignment aperture 204a. In an embodiment, when the lobular hollow tube 104 is properly inserted into the circular alignment aperture 204, each of the slotted retention features 110.1, 110.2, 112.1, 112.2 engage with an edge of the circular alignment aperture 204 (best seen with reference to FIGS. 2-4). Other engagement configurations are discussed herein with reference to FIGS. 5-7 and 8-10.

Reference is now made to FIGS. 2-4, which depict, as viewed from side 21 of the second alignment member 202, three stages of assembly of a quad-lobular hollow tube 104 having the four slotted retention features 110.1, 110.2, 112.1, 112.2 as described above in connection with the second embodiment, where the slotted retention features 110.1, 110.2, 112.1, 112.2 are disposed in a same plane oriented perpendicular to the central axis 108 of the lobular hollow tube 104, to provide four-way elastically averaged alignment and retention with respect to the circular alignment aperture 204.

The first stage of assembly (FIG. 2) depicts the quad-lobular hollow tube 104 just prior to engagement with the circular alignment aperture 204. As depicted, each lobe 106.1, 106.2, 106.3, 106.4 has a purposeful interference condition with the diameter 250 of the circular alignment aperture 204 by an interference dimension of 255. In an embodiment, the interference dimension 255 may be the same for each lobe 106.1, 106.2, 106.3, 106.4, or may be different, thereby alternatively providing four different interference dimensions 255.1, 255.2, 255.3, 255.4, respectively. FIG. 2 depicts the chamfer 206 in dashed hidden lines having a diameter equal to or greater than a maximum outside dimension of the lobular hollow tube 104 illustrating that the chamfer 206 provides a lead in feature for the lobes during their initial insertion and compression.

The second stage of assembly (FIG. 3) depicts a partial engagement position of the quad-lobular hollow tube 104 with the circular alignment aperture 204. As depicted, the quad-lobular hollow tube 104 purposefully and elastically deforms to compensate for the interference 255 (see FIG. 2) to permit the quad-lobular hollow tube 104 to assemble into the circular alignment aperture 204 with a clearance 260 between the outer periphery of the quad-lobular hollow tube 104 and the diameter 250 of the circular alignment aperture 204. In an embodiment, clearance 260 ≥0 inches.

The third stage of assembly (FIG. 4) depicts a full engagement position of the quad-lobular hollow tube 104 with the circular alignment aperture 204. As depicted, the quad-lobular hollow tube 104 elastically expands toward its original shape, with some slight deformation remaining, as the slotted retention features 110.1, 110.2, 112.1, 112.2 engage with the edge of the circular alignment aperture 204. In an embodiment, the width 150 of each slotted retention feature 110.1, 110.2, 112.1, 112.2 is greater than the thickness 265 of the second alignment member 202 (best seen with reference to FIG. 1), thereby permitting a snap-fit type engagement between the slotted retention features 110.1, 110.2, 112.1, 112.2 and the edge of the circular alignment aperture 204.

Reference is now made to FIGS. 5-7, which depict, as viewed from side 21 of the second alignment member 202, three stages of assembly of a quad-lobular hollow tube 104a having the two opposing slotted retention features 110.1, 110.2 as described above in connection with the first embodiment, where the slotted retention features 110.1, 110.2 are disposed in a same plane oriented perpendicular to the central axis 108 of the lobular hollow tube 104a, to provide two-way elastically averaged alignment and retention with respect to an elongated slotted alignment aperture 204a, which may include a chamfer 206a (see FIG. 5) similar to the chamfer 206 described above in connection with the circular alignment aperture 204.

The first stage of assembly (FIG. 5) depicts the quad-lobular hollow tube 104a just prior to engagement with the circular aperture 204a. As depicted, each lobe 106.2, 106.4 has a purposeful interference condition with the minor dimension 270 of the elongated slotted alignment aperture 204a by an interference dimension of 255. In an embodiment, the interference dimension 255 may be the same for each lobe 106.2, 106.4, or may be different, thereby alternatively providing two different interference dimensions 255.5, 255.6, respectively. FIG. 5 depicts the chamfer 206a in dashed hidden lines having an outside dimension equal to or greater than a maximum outside dimension of the lobular hollow tube 104a illustrating that the chamfer 206a provides a lead in feature for the lobes during their initial insertion and compression.

The second stage of assembly (FIG. 6) depicts a partial engagement position of the quad-lobular hollow tube 104a with the elongated slotted alignment aperture 204a. As depicted, the quad-lobular hollow tube 104a purposefully and elastically deforms to compensate for the interference 255 (see FIG. 5) to permit the quad-lobular hollow tube 104a to assemble into the elongated slotted alignment aperture 204a with a clearance 275 between the outer periphery of the quad-lobular hollow tube 104a and the major dimension 280 of the elongated slotted alignment aperture 204a. In an embodiment, clearance 275 ≥0 inches.

The third stage of assembly (FIG. 7) depicts a full engagement position of the quad-lobular hollow tube 104a with the elongated slotted alignment aperture 204a. As depicted, the quad-lobular hollow tube 104a elastically expands toward its original shape, with some slight deformation remaining, as the slotted retention features 110.1, 110.2 engage with the edge of the elongated slotted alignment aperture 204a. In an embodiment, the width 150 of each slotted retention feature 110.1, 110.2 is greater than the thickness 265 of the second alignment member 202 (best seen with reference to FIG. 1), thereby permitting a snap-fit type engagement between the slotted retention features 110.1, 110.2 and the edge of the elongated slotted alignment aperture 204a.

Figure 8:
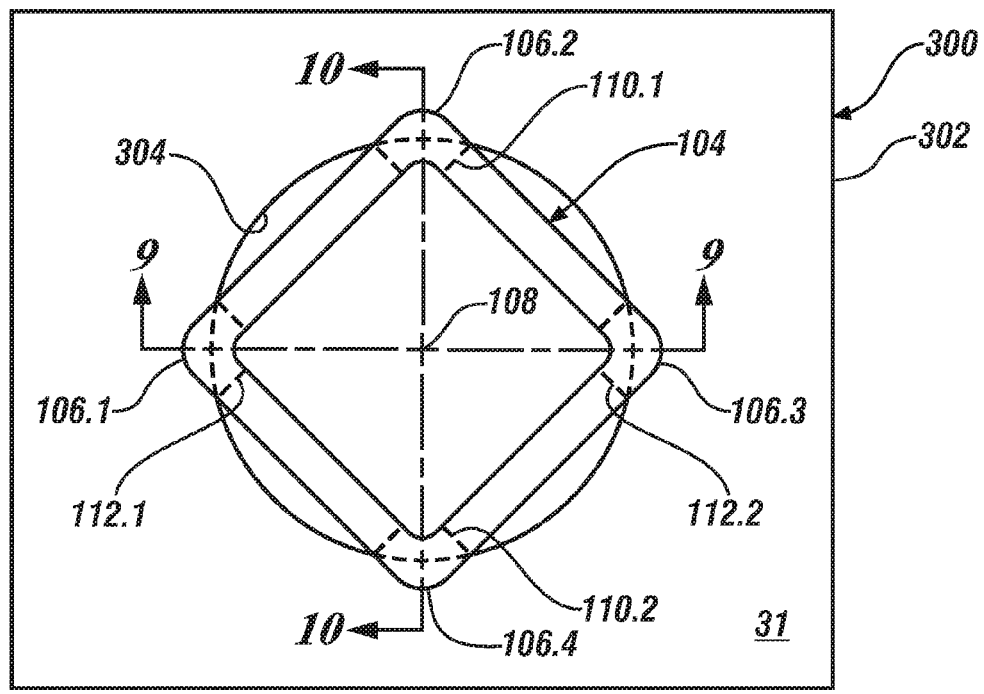
FIG. 8 depicts a rear plan view of the first, second and third components of FIG. 1 in a full-engagement state of assembly with respect to each other, in accordance with an embodiment of the invention.
Figure 9:
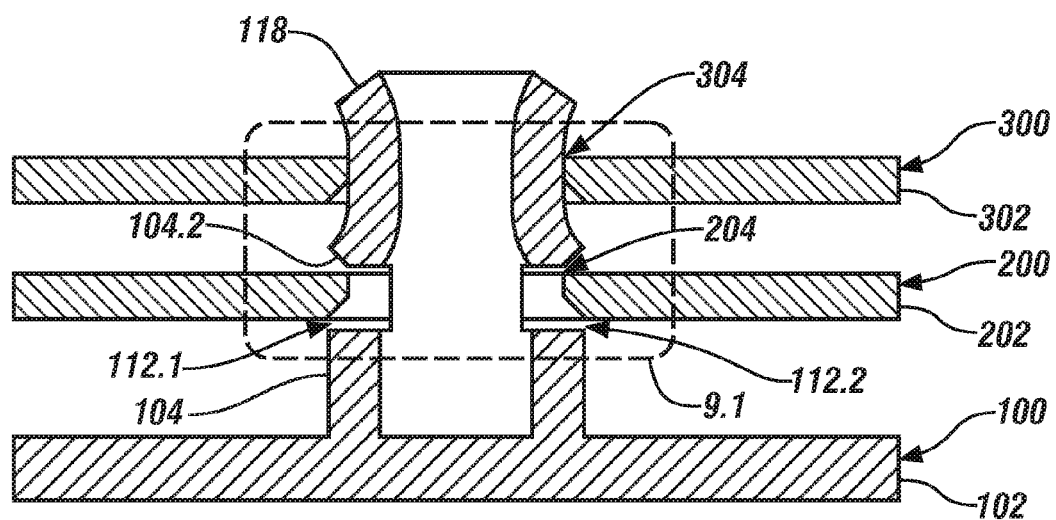
FIG. 9 depicts a cross section view of the elastically averaged alignment and retention system of FIG. 8 taken through section cut line 9-9, with hidden lines removed for clarity.
Figure 10:
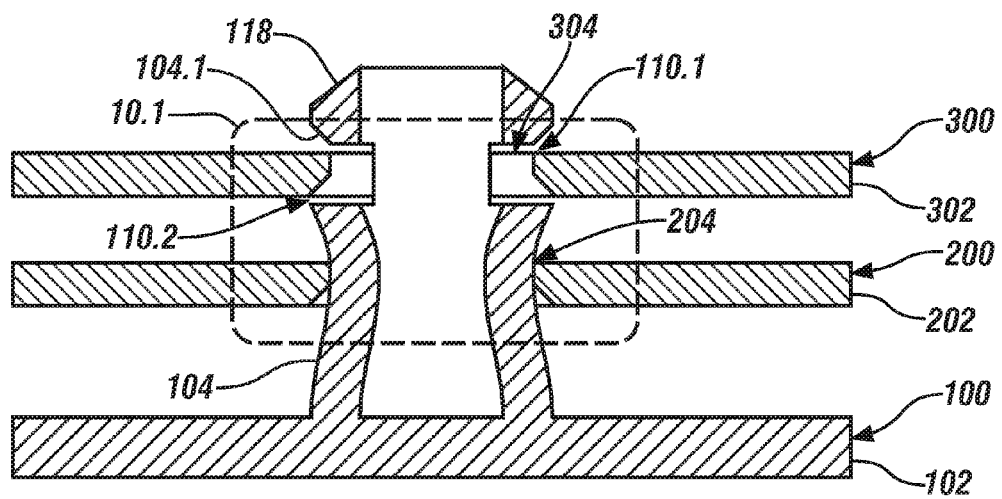
FIG. 10 depicts a cross section view of the elastically averaged alignment and retention system of FIG. 8 take through section cut line 10-10, with hidden lines removed for clarity.

Reference is now made to FIGS. 8-10, in combination with FIG. 1. FIG. 8 depicts a rear view of the elastically averaged alignment system 10 of FIG. 1 with the first, second and third components 100, 200, 300 assembled together, and FIGS. 9 and 10 depict cross section views of the aforementioned third embodiment, where the first pair of the slotted retention features 110.1, 110.2 are disposed in a first plane oriented perpendicular to the central axis 108 (see FIG. 8) of the lobular hollow tube 104, and the second pair of slotted retention features 112.1, 112.2 are disposed in a second plane oriented perpendicular to the central axis 108 of the lobular hollow tube 104, where the first and second planes are different from and spaced apart from each other, to provide an elastically averaged alignment and retention system for three components 100, 200 and 300, as depicted in FIG. 1. As depicted, the third component 300 has a third alignment member 302 and an alignment aperture 304, in the form of a circular alignment aperture, fixedly disposed with respect to the third alignment member 302, where the second component 200 is disposed between the first component 100 and the third component 300. While FIG. 1 depicts three components 100, 200, 300, it will be appreciated that the scope of the invention is not so limited, and also encompasses any number of layers beyond three that is consistent with the disclosure provided herein.

Similar to the aforementioned description of sides 11, 12, 21, 22, the mating side of the third alignment member 302 visible in FIG. 1 is labeled 32, and the non-visible side of the third alignment member 302 that is hidden from view in FIG. 1 is herein referred to by reference label 31. As before, a view from side 32 is herein referred to as a front view, and a view from side 31 is herein referred to as a rear view. Furthermore, dashed lines 20*a* represent direction lines that may be traversed as the first, second and third components 100, 200, 300 are assembled with respect to each other. FIG. 8 is a rear plan view from side 31 of the third component 300, but for simplicity does not illustrate all of the deformation characteristics of the quad-lobular hollow tube 104 with pairs of slotted retention features 110.1, 110.2 and 112.1, 112.2 disposed in different planes. Such deformation characteristics will now be discussed with reference to the cross section views in FIGS. 9 and 10, with section cut lines 9-9 and 10-10 depicted in FIG. 8.

In accordance with the aforementioned third embodiment, the elastically deformable alignment element (quad-lobular hollow tube) 104 is not only configured and disposed to interferingly, deformably and matingly engage the circular alignment aperture 204 of the second component 200, in a manner similar to the description provided above, but is also configured and disposed to interferingly, deformably and matingly engage the circular alignment aperture 304 of the third component 300. As depicted in FIGS. 1, 9 and 10, the first pair of the slotted retention features 110.1, 110.2 are disposed to engage with edges of the circular alignment aperture 304 of the third component 300, and the second pair of the slotted retention features 112.1, 112.2 are disposed to engage with edges of the circular alignment aperture 204 of the second component 200. Since the pairs of slotted retention features 110.1, 110.2 and 112.1, 112.2 are disposed in different planes, the other two lobes of the quad-lobular hollow tube 104 in those respective planes are not slotted, and therefore that portion of the quad-lobular hollow tube 104 must elastically deform when inserted into the respective circular aperture. For example, at the circular alignment aperture 204 of the second component 200, lobes 106.1, 106.3 have slotted retention features 112.1, 112.2, respectively, that engage with the edge of the circular alignment aperture 204 (see FIG. 9 for example), and lobes 106.2, 106.4 have no slotted retention features causing the quad-lobular hollow tube 104 to elastically deform in the circular alignment aperture 204 (see FIG. 10 for example). As further example, at the alignment aperture 304 of the third component 300, lobes 106.2, 106.4 have slotted retention features 110.1, 110.2, respectively, that engage with the edge of the circular alignment aperture 304 (see FIG. 10 for example), and lobes 106.1, 106.3 have no slotted retention features causing the quad-lobular hollow tube 104 to elastically deform in the circular alignment aperture 304 (see FIG. 9 for example).

Figure 9A:
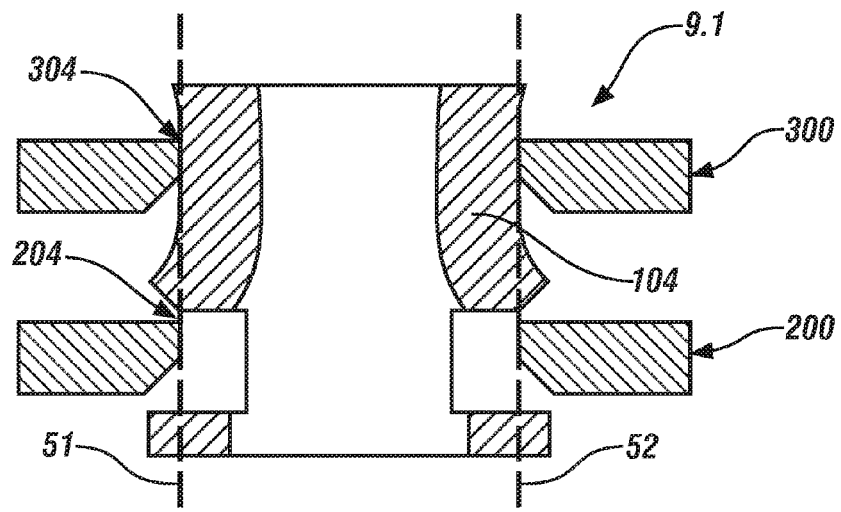
FIG. 9A depicts an enlarged view of detail 9.1 in FIG. 9, with some background detail omitted for clarity.
Figure 10A:
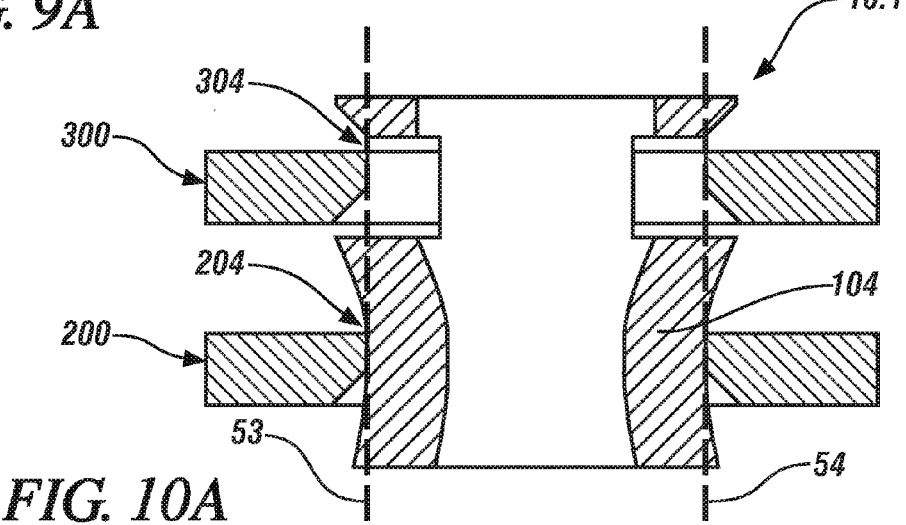
FIG. 10A depicts an enlarged view of detail 10.1 in FIG. 10, with some background detail omitted for clarity.

In an embodiment, and with reference still to FIGS. 9 and 10 in combination with FIG. 1 and FIGS. 9A and 10A, the inside diameters of the second and third alignment apertures 204, 304 are equally sized and concentric such that they are aligned with each other from a plan view perspective, as indicated by dashed lines 51, 52, 53 and 54 in FIGS. 9A and 10A, which causes deformation of the lobular hollow tube 104 in an area absent slotted retention features, and positive snap fit engagement of the lobular hollow tube 104 with a respective second and third component 200, 300 in those areas having slotted retention features.

FIGS. 9 and 10 also depict chamfers 104.1 on the upper edge of slotted retention features 110.1, 110.2, and chamfers 104.2 on the upper edge of slotted retention features 112.1, 112.2, that serve to facilitate removal of the second and third components 200, 300 from the first component 100. Such removal may also be facilitated by including chamfers similar to chamfers 206, 306, but on the opposite surfaces 21, 31 of the second and third components 200, 300.

While FIGS. 1 and 8-10, along with the above description of the third embodiment, depict circular alignment apertures 204, 304 in engagement with the quad-lobular hollow tube 104, it will be appreciated that elongated slotted alignment apertures, such as 204*a* for example, may replace the circular alignment apertures 204, 304 in a strategic orientation relative to the x-y axes that would avoid deformation of the quad-lobular hollow tube 104 in those areas absent slotted retention features. Any and all such combinations of circular and elongated slotted alignment apertures are contemplated herein and considered to be within the scope of the invention disclosed herein.

Figure 11:
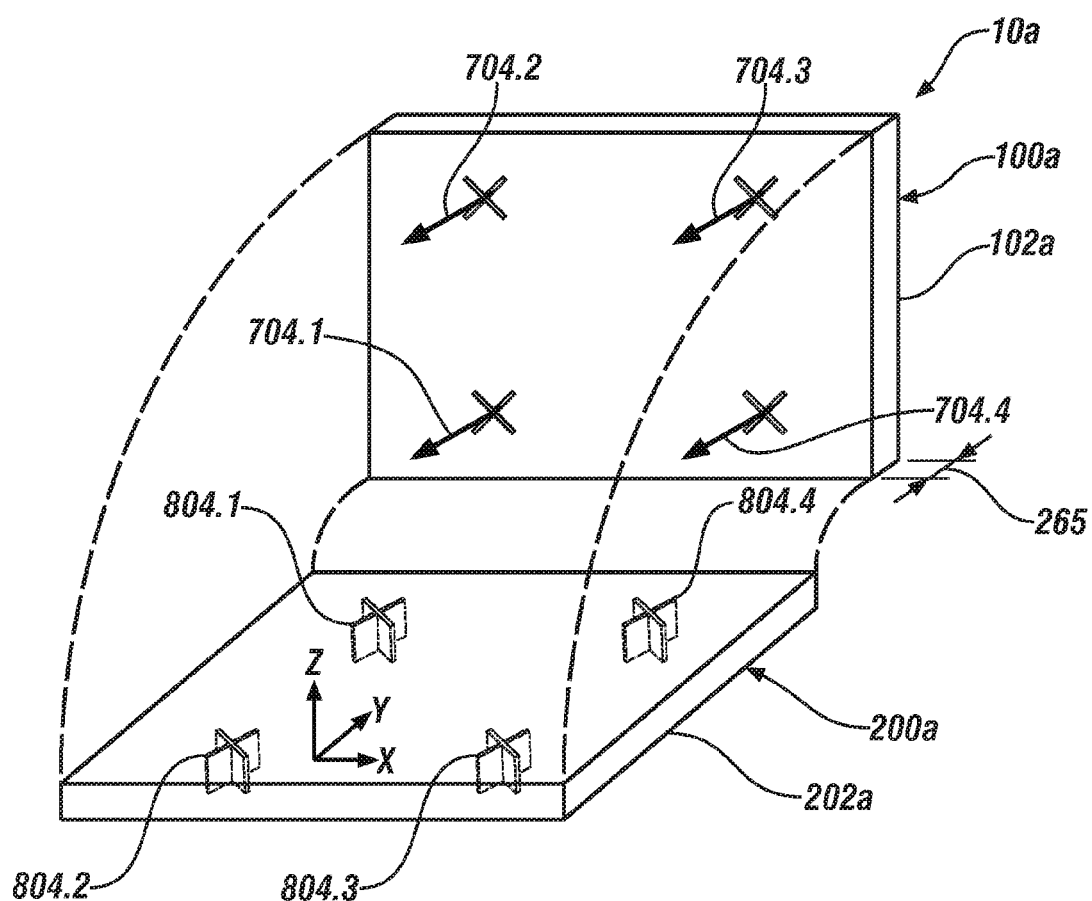
FIG. 11 depicts an exploded assembly view of an elastically averaged alignment and retention system similar to that of FIG. 1, but having only a first and a second component, and having a plurality of elastically averaging alignment elements and alignment apertures depicted generically, in accordance with an embodiment of the invention.

From all of the foregoing, and with reference now to FIG. 11, it will be appreciated that an embodiment of an elastically averaged alignment system 10*a* may include any of the combinations of the elastically deformable alignment elements and respective alignment apertures as described herein, or as described in commonly owned, co-pending U.S. patent application Ser. No. 13/187,675. In a general sense, FIG. 11 depicts a first component 100*a* having a first alignment member 102*a*, and a second component 200*a* having a second alignment member 202*a* with a thickness 265, similar to the un-primed counterparts depicted in FIG. 1. In FIG. 11, the X-based-arrowhead-graphics 704.1, 704.2, 704.3, 704.4 represent elastically deformable alignment elements, such as the elastically deformable alignment element 104 described herein or the elastically deformable alignment element described in commonly owned, co-pending U.S. patent application Ser. No. 13/187,675, and the 3D-X-graphics 804.1, 804.2, 804.3, 804.4 represent alignment apertures, such as alignment apertures 204, 204*a*, 304 as described herein, pierced through the thickness 265. As depicted in FIG. 11, the elastically deformable alignment elements and alignment apertures are configured and disposed to interferingly, deformably and matingly engage with each other in the following pairs: 704.1 and 804.1; 704.2 and 804.2; 704.3 and 804.3; and, 704.4 and 804.4. While only four pairs of elastically deformable alignment elements and alignment apertures are depicted in FIG. 11, it will be appreciated that the scope of the invention is not so limited and encompasses any number of pairs of elastically deformable alignment elements and alignment apertures suitable for a purpose disclosed herein. By strategically placing two-way and four-way alignment features on the various components as disclosed herein, a wide range of alignment control is possible, including edge alignment control, corner alignment control, and center alignment control, for example.

Figure 12:
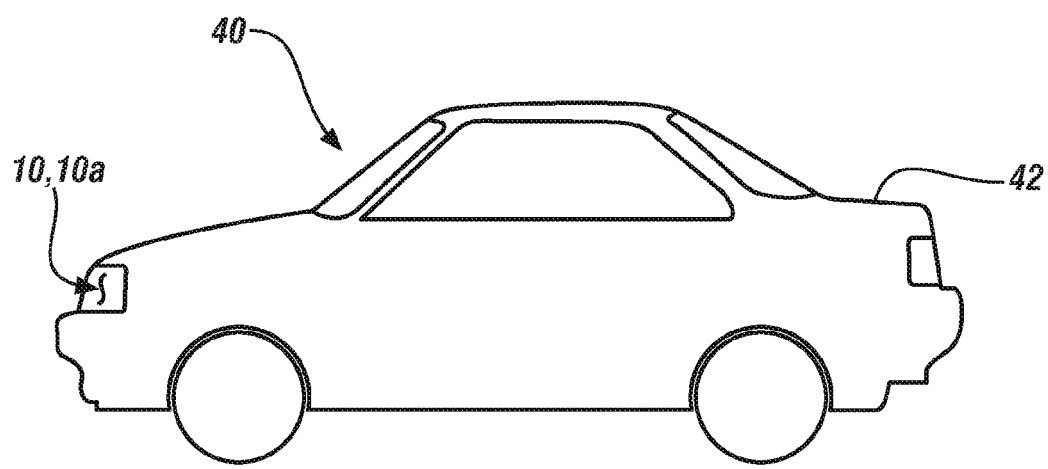
FIG. 12 depicts a vehicle employing an elastically averaged alignment and retention system as depicted in any of FIGS. 1-11, in accordance with an embodiment of the invention.

In view of all of the foregoing, and with reference now to FIG. 12, it will be appreciated that an embodiment of the invention also includes a vehicle 40 having a body 42 with an elastically averaged alignment system 10, 10a as herein disclosed integrally arranged with the body 42. In the embodiment of FIG. 12, the elastically averaged alignment system 10, 10a is depicted forming at least a portion of a front grill of the vehicle 40. However, it is contemplated that an elastically averaged alignment system 10, 10a as herein disclosed may be utilized with other feature of the vehicle 40, such as interior trim for example, where the first component 100 forms a first portion of the vehicle 40, the second component 200 forms a second portion of the vehicle 40, and the third component 300 forms a third portion of the vehicle 40.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastically averaged alignment system, comprising:
   a first component comprising a first alignment member and an elastically deformable alignment element fixedly disposed with respect to the first alignment member;
   a second component comprising a second alignment member and an alignment aperture fixedly disposed with respect to the second alignment member;
   wherein the elastically deformable alignment element is configured and disposed to interferingly, deformably and matingly engage the alignment aperture;
   wherein the elastically deformable alignment element comprises a lobular hollow tube having four lobes, the elastically deformable alignment element comprising a slotted retention feature on each of two opposing lobes that extend from an outer surface of the hollow tube radially inward toward a central axis of the hollow tube;
   wherein portions of the elastically deformable alignment element when inserted into the alignment aperture elastically deform to an elastically averaged final configuration that aligns the first alignment member with the second alignment member in at least two planar orthogonal directions; and
   wherein each of the slotted retention features engages with an edge of the alignment aperture.

2. The elastically averaged alignment system of claim 1, wherein:
   portions of the elastically deformable alignment element when inserted into the alignment aperture elastically deform to an elastically averaged final configuration that aligns the first alignment member with the second alignment member in four planar orthogonal directions.

3. The elastically averaged alignment system of claim 1, wherein:
   the alignment aperture comprises a circular aperture.

4. The elastically averaged alignment system of claim 1, wherein:
   the alignment aperture comprises an elongated slotted aperture.

5. The elastically averaged alignment system of claim 1, wherein:
   the slotted retention features are disposed in a same plane oriented perpendicular to the central axis of the hollow tube.

6. The elastically averaged alignment system of claim 1, wherein:
   the elastically deformable alignment element comprises a slotted retention feature on each of the four lobes, each slotted retention feature extending from an outer surface of the hollow tube radially inward toward the central axis of the hollow tube.

7. The elastically averaged alignment system of claim 6, wherein:
   a first pair of the slotted retention features oppose each other in a first plane oriented perpendicular to the central axis of the hollow tube; and
   a second pair of the slotted retention features oppose each other in the first plane.

8. The elastically averaged alignment system of claim 6, wherein:
   a first pair of the slotted retention features oppose each other in a first plane oriented perpendicular to the central axis of the hollow tube; and
   a second pair of the slotted retention features oppose each other in a second plane oriented perpendicular to the central axis of the hollow tube, the second plane being different from the first plane.

9. The elastically averaged alignment system of claim 1, wherein:
   the slotted retention features extend only partially from an outer surface to an inner surface of the hollow tube.

10. The elastically averaged alignment system of claim 1, wherein:
    the slotted retention features are through-slots that extend completely from an outer surface to an inner surface of the hollow tube.

11. The elastically averaged alignment system of claim 1, wherein:
    the elastically deformable alignment element comprises a proximal end proximate the first alignment member, and a distal end spaced apart from the proximal end, the distal end comprising a taper.

12. The elastically averaged alignment system of claim 1, wherein:
    the second alignment member comprises a chamfer that circumscribes the alignment aperture.

13. The elastically averaged alignment system of claim 1, wherein:
    the first component further comprises a second elastically deformable alignment element fixedly disposed with respect to the first alignment member;
    the second component further comprises a second alignment aperture fixedly disposed with respect to the second alignment member;
    the second elastically deformable alignment element is configured and disposed to interferingly, deformably and matingly engage the second alignment aperture; and
    portions of the second elastically deformable alignment element when inserted into the second alignment aperture elastically deform to an elastically averaged final configuration that further aligns the first alignment member with the second alignment member in at least two planar orthogonal directions.

14. The elastically averaged alignment system of claim 8, further comprising:
- a third component comprising a third alignment member and an alignment aperture fixedly disposed with respect to the third alignment member, the second component being disposed between the first and third components;
- wherein the elastically deformable alignment element is configured and disposed to interferingly, deformably and matingly engage the alignment aperture of the third component; and
- wherein the first pair of the slotted retention features are disposed to engage with edges of the alignment aperture of the third component, and the second pair of the slotted retention features are disposed to engage with edges of the alignment aperture of the second component.

15. The elastically averaged alignment system of claim 1, wherein:
- the first component comprises a first portion of a vehicle; and
- the second component comprises a second portion of the vehicle.

16. The elastically averaged alignment system of claim 1, wherein the first component comprises more than one of the elastically deformable alignment element and the second component comprises more than one of the alignment aperture, the more than one elastically deformable alignment elements being geometrically distributed with respect to respective ones of the more than one alignment apertures, such that portions of the elastically deformable alignment element of respective ones of the more than one elastically deformable alignment elements, when engaged with respective ones of the more than one alignment apertures, elastically deform to an elastically averaged final configuration that further aligns the first alignment member with the second alignment member in at least two of four planar orthogonal directions.

* * * * *